United States Patent
Emigh et al.

(10) Patent No.: US 12,489,278 B2
(45) Date of Patent: *Dec. 2, 2025

(54) MOUNTING DEVICE WITH FASTENER RECEIVING STRUCTURE

(71) Applicant: Brilliant NextGen Inc., San Mateo, CA (US)

(72) Inventors: Aaron T. Emigh, Incline Village, NV (US); Steven Stanek, Fremont, CA (US)

(73) Assignee: Brilliant NextGen Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,648

(22) Filed: Jul. 31, 2023

(65) Prior Publication Data
US 2023/0420922 A1    Dec. 28, 2023

Related U.S. Application Data

(63) Continuation of application No. 17/522,743, filed on Nov. 9, 2021, now Pat. No. 11,715,938, which is a continuation of application No. 16/903,838, filed on Jun. 17, 2020, now Pat. No. 11,211,777, which is a
(Continued)

(51) Int. Cl.
| | | |
|---|---|---|
| *H02G 3/14* | (2006.01) | |
| *F16B 5/00* | (2006.01) | |
| *F16B 5/06* | (2006.01) | |
| *H02B 1/46* | (2006.01) | |

(52) U.S. Cl.
CPC ............. *H02B 1/46* (2013.01); *F16B 5/0004* (2013.01); *F16B 5/0692* (2013.01)

(58) Field of Classification Search
CPC ... H02B 1/46; H02B 1/48; H02B 1/32; H02B 1/26; H02B 1/00; F16B 5/0004; F16B 5/0692; H02G 3/08; H02G 3/081; H02G 3/14; H02G 3/10; H02G 3/12; H05K 5/02; H05K 5/03; H05K 5/0204; H05K 5/0217
USPC ................. 174/66, 67, 50, 53, 58, 480, 481; 220/241, 242, 3.2, 3.3, 4.02
See application file for complete search history.

(56) References Cited

U.S. PATENT DOCUMENTS

| | | |
|---|---|---|
| 2,043,865 A | 6/1936 | Place |
| 2,149,719 A | 3/1939 | Arnest |
| 3,745,664 A | 7/1973 | Altseimer |

(Continued)

FOREIGN PATENT DOCUMENTS

| | | |
|---|---|---|
| CN | 102927101 A | 2/2013 |
| CN | 204493381 U | 7/2015 |

OTHER PUBLICATIONS

International Search Report and Written Opinion from PCT Application No. PCT/US19/42842, mailed Nov. 14, 2019, 8 pages.
(Continued)

*Primary Examiner* — Angel R Estrada
(74) *Attorney, Agent, or Firm* — Mahamedi IP Law LLP

(57) ABSTRACT

A mounting device includes a panel portion, and a fastener receiving structure provided within a perimeter of the panel portion. The fastener receiving structure can include a flexure mechanism to enable at least a portion of the fastener receiving structure to flex with insertion of a fastener into the flexure mechanism that attaches the panel portion against an underlying surface.

9 Claims, 19 Drawing Sheets

Related U.S. Application Data continuation of application No. 16/517,553, filed on Jul. 20, 2019, now Pat. No. 10,749,319.

(60) Provisional application No. 62/701,418, filed on Jul. 20, 2018, provisional application No. 62/744,431, filed on Oct. 11, 2018.

(56) References Cited

U.S. PATENT DOCUMENTS

| | | |
|---|---|---|
| 3,854,374 A | 12/1974 | Boyle |
| 4,105,862 A | 8/1978 | Hoehn |
| 5,170,013 A | 12/1992 | Borsh |
| 5,170,014 A | 12/1992 | Borsh |
| 5,594,205 A | 1/1997 | Cancellieri |
| 5,623,124 A | 4/1997 | Chien |
| 5,907,126 A | 5/1999 | Cancellieri |
| 6,005,190 A | 12/1999 | Stark |
| 6,023,021 A | 2/2000 | Matthews |
| 6,566,602 B1 | 5/2003 | Miller |
| 6,608,253 B1 | 8/2003 | Rintz |
| 6,794,572 B1 | 9/2004 | Chiang |
| 7,030,319 B2 | 4/2006 | Johnsen |
| 7,456,358 B2 | 11/2008 | Swiencicki |
| 7,950,859 B2 | 5/2011 | Zhang |
| 8,261,926 B2 | 9/2012 | Bradley |
| 10,749,319 B2 * | 8/2020 | Emigh ................. F16B 5/0004 |
| 10,761,404 B2 | 9/2020 | Leimer |
| 10,826,554 B2 | 11/2020 | Lee |
| 11,054,719 B2 | 7/2021 | VanTassell |
| 11,143,937 B2 | 10/2021 | Yeh |
| 11,211,777 B2 * | 12/2021 | Emigh ................. F16B 5/0692 |
| 11,422,433 B2 | 8/2022 | Abe |
| 11,715,938 B2 * | 8/2023 | Emigh ................... H02G 3/121 |
| | | 174/50 |
| 11,728,628 B2 | 8/2023 | Emigh |
| 2006/0005989 A1 | 1/2006 | Swiencicki et al. |
| 2006/0079126 A1 | 4/2006 | Kidman |
| 2009/0126968 A1 | 5/2009 | Glas |
| 2020/0028335 A1 | 1/2020 | Emigh |
| 2020/0388995 A1 | 12/2020 | Emigh |
| 2021/0273419 A1 | 9/2021 | Emigh |
| 2021/0273420 A1 | 9/2021 | Emigh |

OTHER PUBLICATIONS

First Office Action dated Aug. 4, 2021, 10 pages, English translation included, Application No. 201980061858X.

Extended European Search Report dated Mar. 9, 2022, Application No. 19837901.8 14 pages.

* cited by examiner

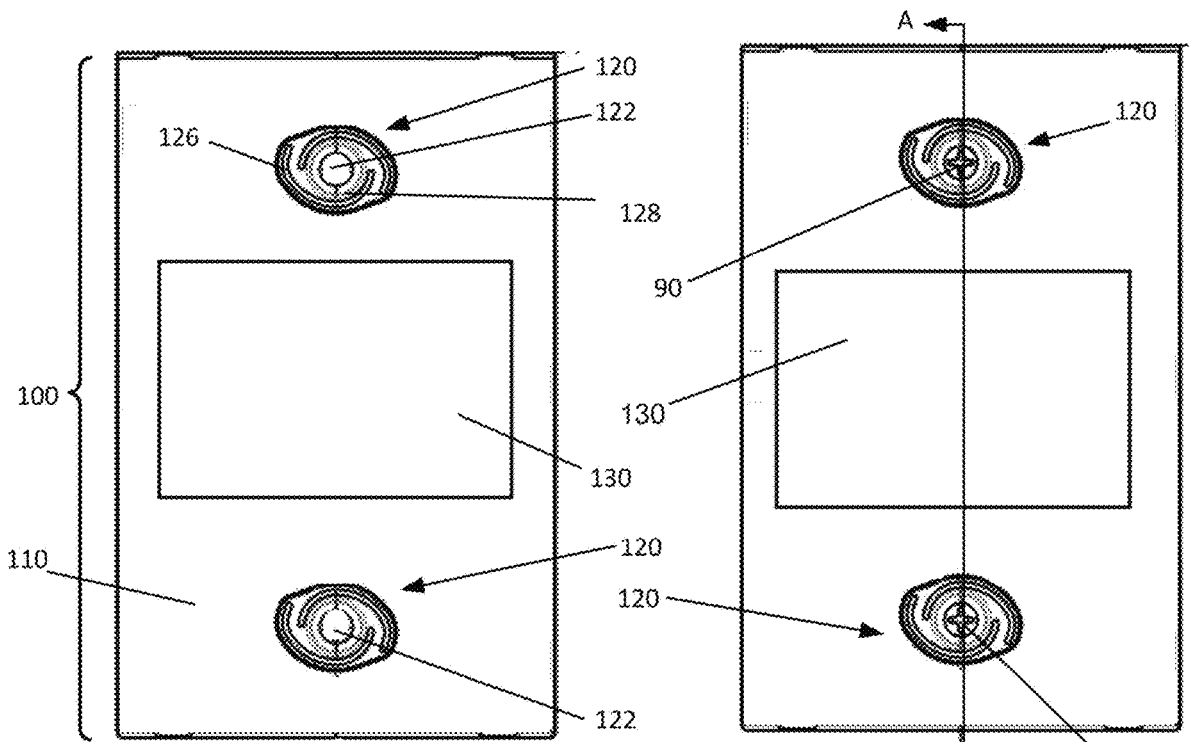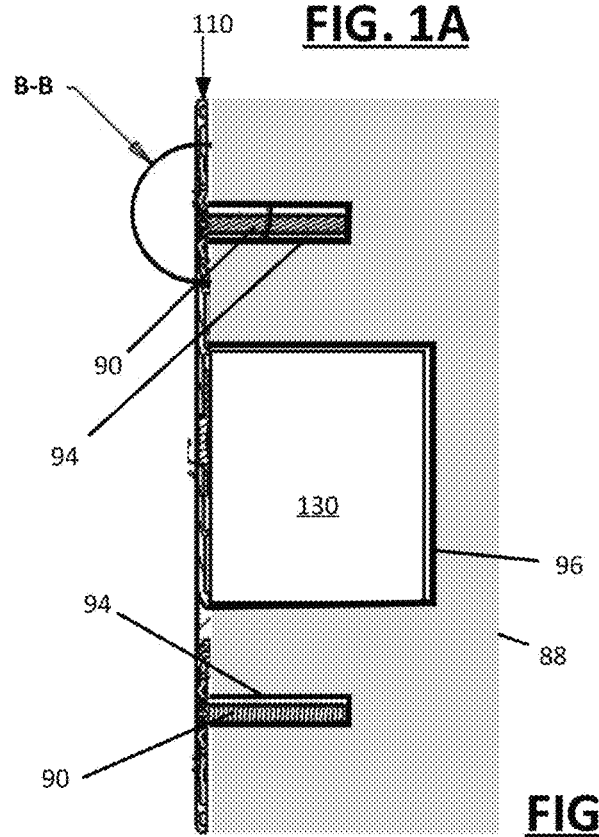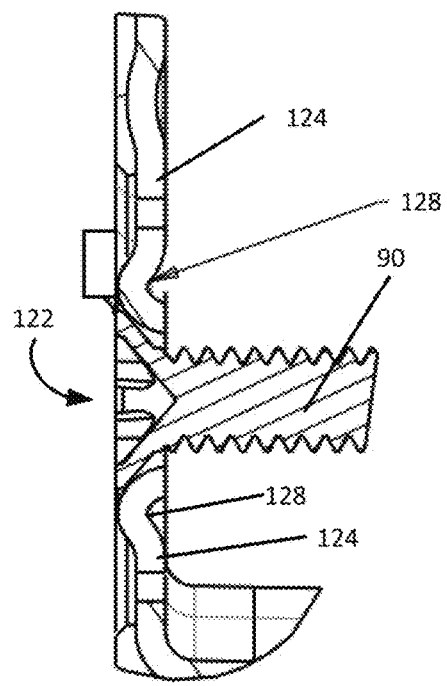
FIG. 1A
FIG. 1B
FIG. 1C
FIG. 1D

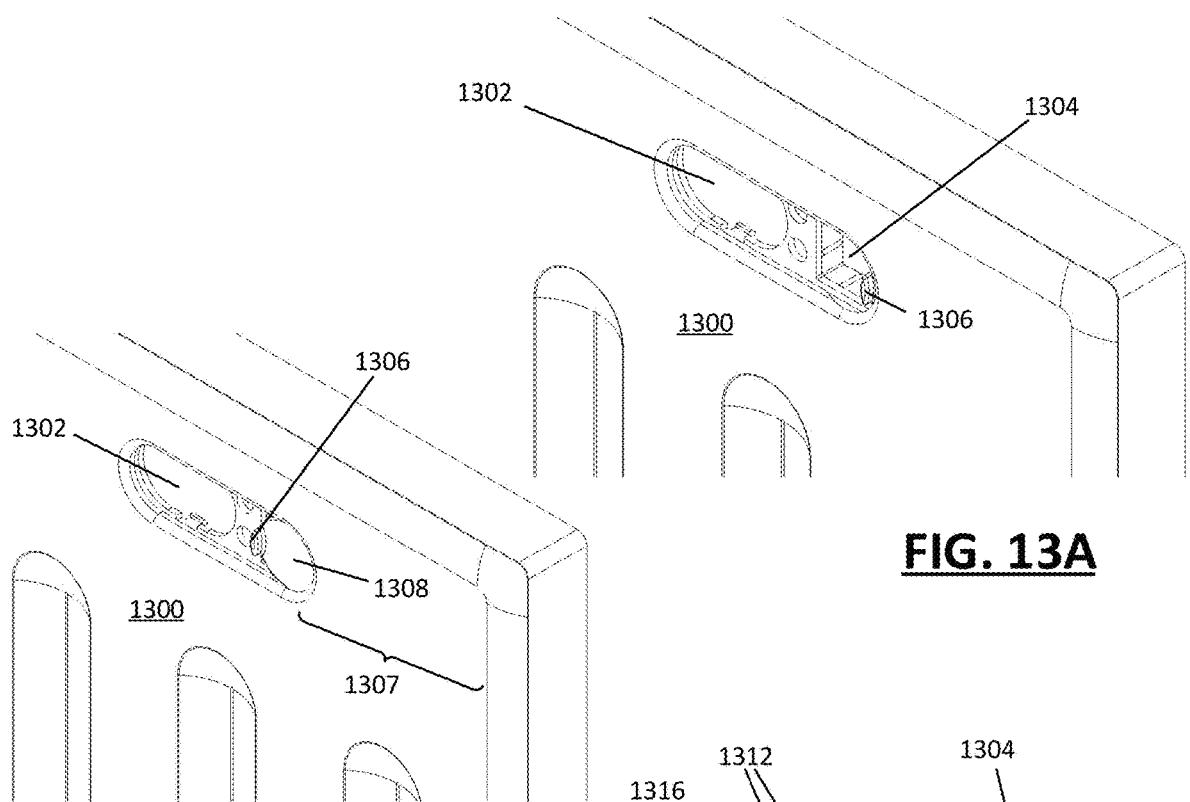
FIG. 13A
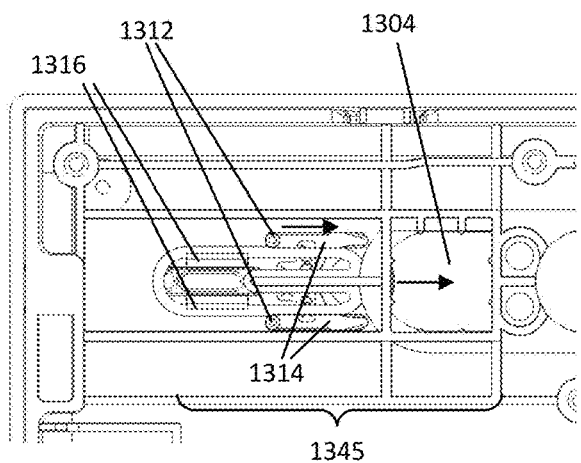
FIG. 13B
FIG. 13C
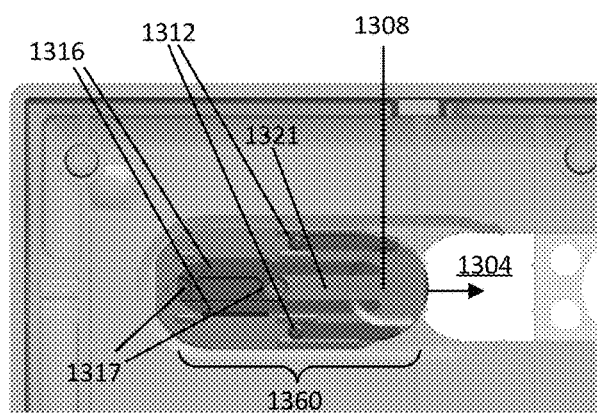
FIG. 13D

MOUNTING DEVICE WITH FASTENER RECEIVING STRUCTURE

CROSS-REFERENCE TO RELATED APPLICATIONS

This application is a continuation application of U.S. patent application Ser. No. 17/522,743, filed on Nov. 9, 2021, which is a continuation application of U.S. patent application Ser. No. 16/903,838 (now U.S. Pat. No. 11,211,777), filed on Jun. 17, 2020, which is continuation of U.S. patent application Ser. No. 16/517,553 (now U.S. Pat. No. 10,749,319), filed on Jul. 20, 2019; which claims the benefit of priority to U.S. Provisional Application No. 62/701,418, filed on Jul. 20, 2018, and U.S. Provisional Application No. 62/744,431, filed on Oct. 11, 2018; the aforementioned applications being hereby incorporated by reference in their entireties.

TECHNICAL FIELD

Examples relate to mounting devices, and more specifically to mounting devices with fastener receiving structures.

BACKGROUND

Numerous types of mounting devices require installation using screws, bolts, nails, or other insertive fasteners. For example, screws such as machine screws may be used to install a device such as a switch, e.g. a light or fan switch, into an electrical box, which may for example be in or attached to a wall. It is presently difficult to ensure that such a device is securely fastened without being fastened so tightly as to warp or otherwise cause damage to the device.

BRIEF DESCRIPTION OF THE DRAWINGS

FIG. 1A through FIG. 1D illustrate an example of a mounting device having a fastener receiving structure with strain reduction capabilities.

FIG. 13A through 13D illustrate an example embodiment of a shutter mechanism for an electronic device, according to various examples;

DETAILED DESCRIPTION

Figure 1E:
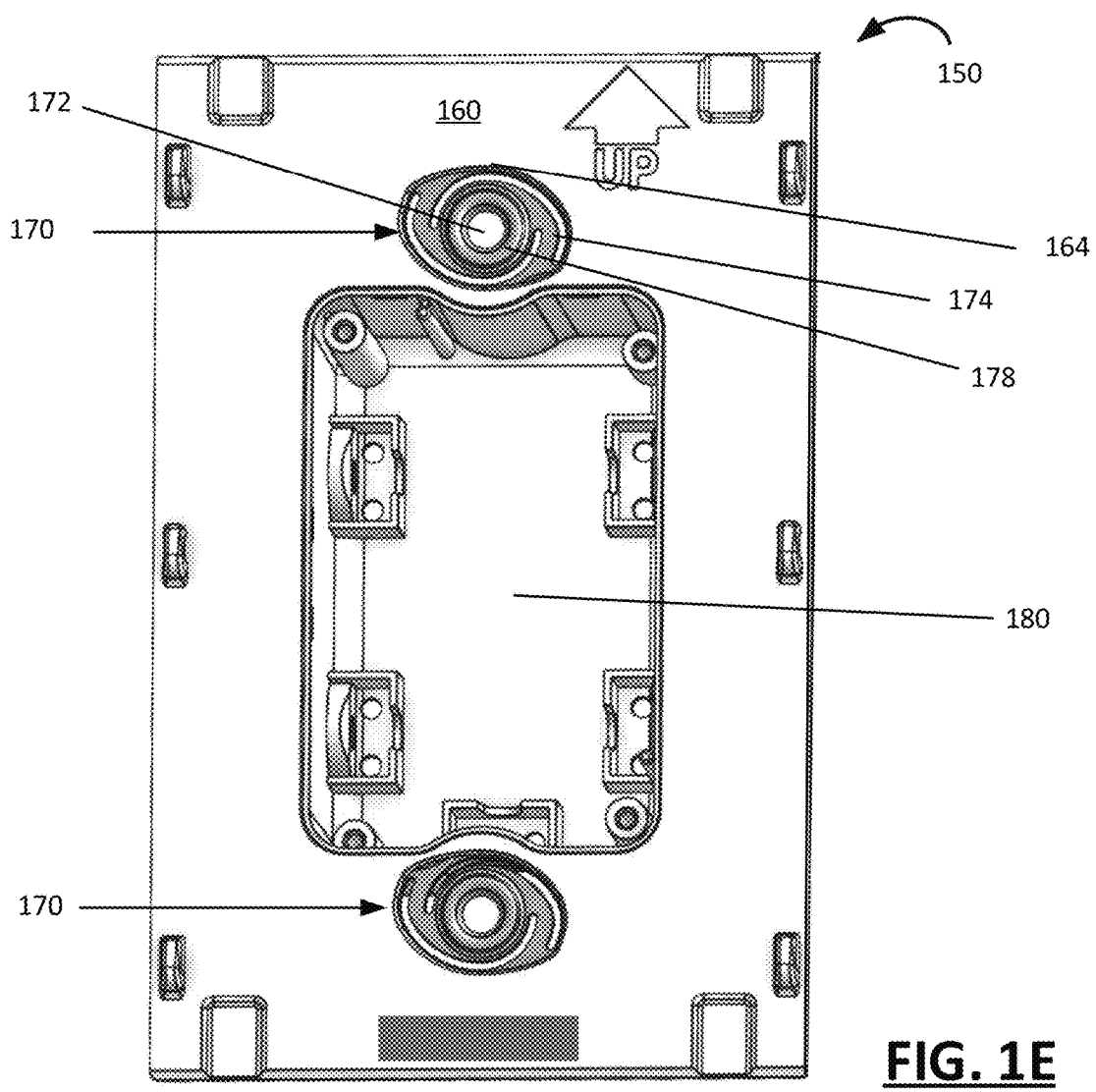
FIG. 1E illustrates a variation of an example mounting device such as shown by FIG. 1A through FIG. 1D.

Examples described throughout the present disclosure provide a base device for an electronic module or a mounting device that includes a panel portion and one or more fastener receiving structures each provided within a perimeter or opening of the panel portion. The fastener receiving structure can include an aperture to receive an insertive fastener, and a flexure mechanism to enable at least a portion of the fastener receiving structure that includes the aperture to flex with insertion of the fastener in the aperture that attaches the panel portion against an underlying surface. A mounting device refers herein to any device that may be mounted to another structure, such as a receptacle (e.g., an electrical box), using one or more fasteners (e.g., screws).

Mounting Device with Over-Strain Protection

FIG. 1A through FIG. 1D illustrate examples of a mounting device having at least one fastener receiving structure 120 with strain reduction capabilities. According to examples, a mounting device 100 includes a panel portion 110 that can be mounted to an underlying structure (e.g., receptacle) or surface (e.g., wall) through insertion of a fastener 90 into a fastener receiving structure 120. The fastener receiving structure 120 includes an aperture 122 for receiving the fastener, as well as a flexure mechanism that enables the aperture 122 to travel inwards and/or flex with insertion of the fastener. In examples, the mounting device 100 is mountable to an underlying surface or structure, with the panel portion 110 remaining planar while an insertive fastener secures the panel against the underlying surface or structure.

In some examples, the mounting device 100 corresponds to a device or assembly that attaches to an electrical box to retain electrical wiring for lighting switches. The mounting device 100 can include a receptacle portion 130 that can insert into an opening formed in an underlying wall when the mounting device 100 is installed. However, while some examples are illustrated in the context of a mounting device that installs to an electrical box, in other variations, the mounting device 100 may correspond to another type of structure or device, such as a faceplate that mounts onto another type of structure or surface.

The mounting device 100 includes a first fastener receiving structure 120 provided in a top region of the panel portion 110, and a second fastener receiving structure 120 provided in a bottom region of the panel portion 110. In variations, more or fewer fastener receiving structures 120 may be used. According to examples, the installation of the mounting device 100 can utilize one or more fasteners to attach the panel portion 110 to an underlying surface. Under conventional designs, the insertion of fasteners cause strain and stress on the surface of the panel portion 110. With strain and stress, panel portion 110 can undergo deflection, fracture, or otherwise lose structural integrity. In some examples, the panel portion 110 may also include sensitive components that can fail with deflection or structural failure of the panel portion 110. By way of example, the panel portion 110 may support, or otherwise provide electronic components, such as circuitry and/or connectors, which can fail as a result of deflection or fracturing by the panel portion 110. In examples, the fastener receiving structure 120 can receive and secure the panel portion 110 to an underlying surface or structure, while reducing or eliminating strain that would otherwise cause the panel portion 110 to deflect or lose structural integrity.

FIG. 1A illustrates the mounting device 100 in a pre-installed state, prior to the fastener receiving structure 120 receiving an insertive fastener. The fastener receiving structure 120 can be formed within a perimeter of the panel portion 110. In an example, the fastener receiving structure 120 includes a flexure mechanism that can be formed by one or more voids 126 (e.g., the curved slits shown in FIG. 1A), one or more members 124 extending from or defining each void 126, and a ring structure 128 which connects to the members 124.

FIG. 1B illustrates the mounting device 100 in an installed (or partially-installed state), where an insertive fastener 90 is inserted into the aperture 122. The insertive fastener 90 may correspond to, for example, a screw. In wall mounting applications (e.g., where the mounting device 100 attaches to an electrical box to provide an electrical switch), the insertive fastener 90 may correspond to a dry wall screw.

FIG. 1C is a side cross-sectional view of FIG. 1B, along line A-A. In FIG. 1C, fasteners 90 are shown to be fully inserted into respective apertures 122. An inserted length of each fastener 90 is extended into a fastener receptacle 94 of an underlying wall 88. The receptacle portion 130 of the mounting device 100 may also fit within a corresponding opening 96 (e.g., a rough drywall hole) formed into the wall 88. With the fasteners 90 inserted into the respective fastener receiving structures 120, the panel portion 110 can remain planar and secured flush against a room-facing surface of the wall 88.

FIG. 1D is a closeup of region B-B of FIG. 1C. In an example shown, the fastener 90 is inserted in the aperture 122 defined by the ring structure 128. The ring structure 128 is connected to the members 124, which extends to the respective void 126. In one implementation, once the fastener 90 is fully inserted into the aperture 122, further insertion of the fastener 90 causes the inserted width of the fastener 90 to increase, such as would be the case of partial insertion of a screw head. With insertion of the greater width, the ring structure 128 can expand. For example, the ring structure 128 may flex as inward force of a head of the fastener 90 is applied to the fastener receiving structure 120 (e.g., as the fastener 90 is tightened into the fastener receptacle 94). As an addition or variation, the members 124 of the fastener receiving structure 120 can travel inward or otherwise flex to accommodate the insertion of the fastener 90. In this way, the fastener receiving structure 120 can prevent deflection and/or loss of structural integrity of the panel portion 110 that could otherwise result from the strain and stress caused by over-insertion of the fastener 90.

In some examples, the fastener receiving structure 120 can be unitarily formed with respect to the panel portion 110. For example, the panel portion 110 can be formed from flexible material of a given thickness, and the fastener receiving structure 120 may be defined in part by slits and/or other voids formed into a segment of the panel portion 110 (e.g., a portion having a reduced thickness). The formation of slits and/or voids can enable a portion of the fastener receiving structure 120 that contains the aperture 122 to flex and/or travel inwards, to accommodate the inserted fastener 90. For example, when the fastener 90 is over-inserted, the head of the fastener 90 can partially enter the aperture 122 or otherwise place an inward force on the ring structure 128. In such instances, the ring structure 128 and/or member(s) 124 can flex to increase the aperture 122 without straining the panel portion 110. As an addition or variation, the ring structure 128 and/or member(s) 124 can travel inward with insertion of the fastener 90, to reduce or eliminate the resulting strain.

FIG. 1E illustrates a variation of an example mounting device, such as examples shown by FIG. 1A through FIG. 1D. In an example of FIG. 1E, a mounting device 150 corresponds to a base structure or module that can mate to an electrical box of a dwelling, to receive, for example, line, load, and neutral wiring. As provided herein, a "dwelling" can comprise a household, office space, place of business, or any interior or even exterior space that includes typical wiring and power infrastructure. In other variations, the mounting device 150 can be implemented as another type of device, such as a faceplate or monolithic device that can be fastened (e.g., via screw) to another surface or structure. In an example of FIG. 1E, the mounting device 150 includes a panel portion 160 and fastener receiving structures 170. The mounting device 150 may also include a receptacle portion 180, which can retain electronic wiring or components. In variations such as described with respect to FIG. 6A and FIG. 6B, the receptacle portion 180 can include electronic componentry and a connector interface for enabling another device (e.g., an electronic module) to be mounted against the mounting device 150.

In an example of FIG. 1E, the fastener receiving structure 170 is formed separately from the panel portion 160. For example, the panel portion 160 may be formed from molded plastic, and the fastener receiving structure 170 may be formed from metal. The fastener receiving structure 170 can be formed within a void of the panel portion 160, with a perimeter of the void providing an interior perimeter interface 164 for the fastener receiving structure 170. The fastener receiving structure 170 can include one or more members 174 which extend from the perimeter interface 164 to a ring structure 178 that defines an aperture 172 to receive a fastener.

In variations, the shape or dimension of the members 174 may vary based on design and implementation. As described with other examples, the members 174 are configured to provide flexure and/or inward travel for the ring structure 178 and aperture 172 when the aperture 172 receives an insertive fastener (e.g., a screw). In this way, an insertive fastener can be inserted inward through aperture 172, with the force applied from the insertion causing the ring structure 178 and aperture 172 to travel inward. In variations, the members 174 and/or ring structure 178 can have additional flexure to accommodate additional width of the insertive fastener, resulting from over-insertion of the insertive fastener.

Figure 1F:
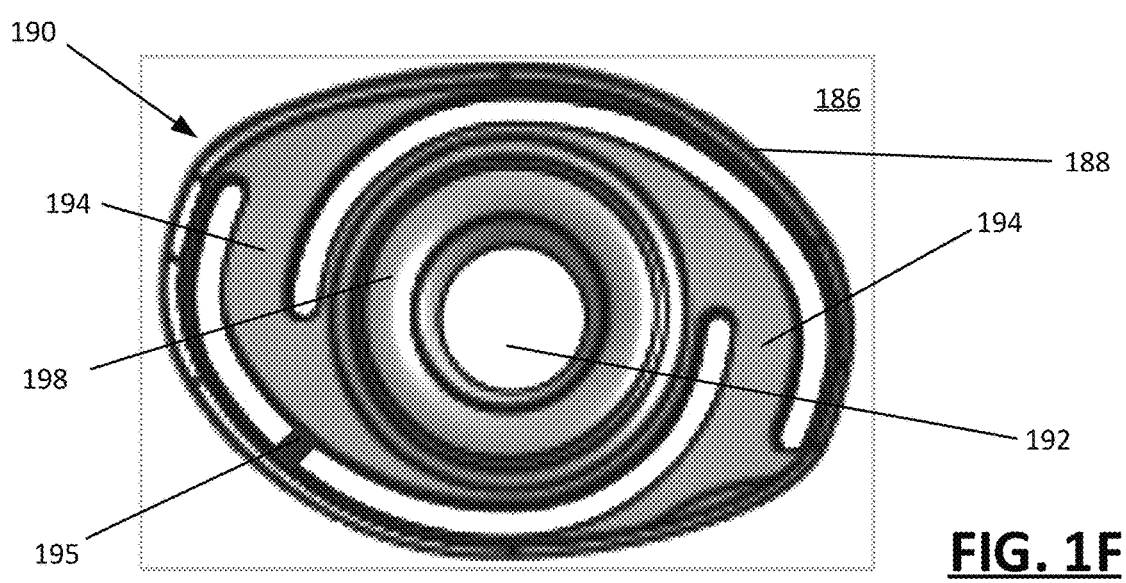
FIG. 1F illustrates a variation of a fastener receiving structure, for use with mounting devices, according to one or more examples.

FIG. 1F illustrates a variation of a fastener receiving structure, for use with mounting devices. In an example of FIG. 1F, a fastener receiving structure 190 is provided on a panel portion 186, with members 194 that extend from an interior perimeter interface 188 of the panel portion 186. The members 194 can extend from the interior perimeter interface 188 to a ring structure 198 that defines an aperture 192 for receiving an insertive fastener. The members 194 can be shaped in the form of an arc (e.g., corkscrew), as shown by FIG. 1E. In other variations, the members 194 can have alternative shapes, such as U-shaped members (e.g., see FIG. 2A and FIG. 2B), or as leg members (e.g., see FIG. 3A and FIG. 3B). As described with other examples, the members 194 are configured to provide flexure and/or inward travel for the ring structure 198 and the corresponding aperture 192.

In an example of FIG. 1F, the fastener receiving structure 190 includes a failure rib 195 that attaches to the interior perimeter interface 188 of the panel portion 186 and to one or more of the members 194. When an insertion member is inserted into the aperture 192, the members 194 can travel inward, to prevent strain and stress on the panel portion 186 because of the insertion member being inserted. The failure rib 195 can dimensioned and/or composed of a material to correlate to a predetermined acceptable depth of travel for the connected member 194. If the connected member 194 reaches or passes a depth that exceeds the dimension and/or material properties of the failure rib 195, the failure rib 195 snaps, causing an audible and/or physical feedback. The audible and/or physical feedback can be used to signify that an installer of the mounting device should stop inserting the fastener. The dimension and/or material of the failure rib 195 can be selected to provide the installer with feedback just before the inserted fastener is over-inserted to a point where the inward travel of the member 194 could cause damage to the member 194 or to the panel portion 186. In this way, the failure rib 195 simplifies the installation process, by providing feedback as to when the installer should stop, for example, drilling or turning a screw during installation of the mounting device.

Figure 2A:
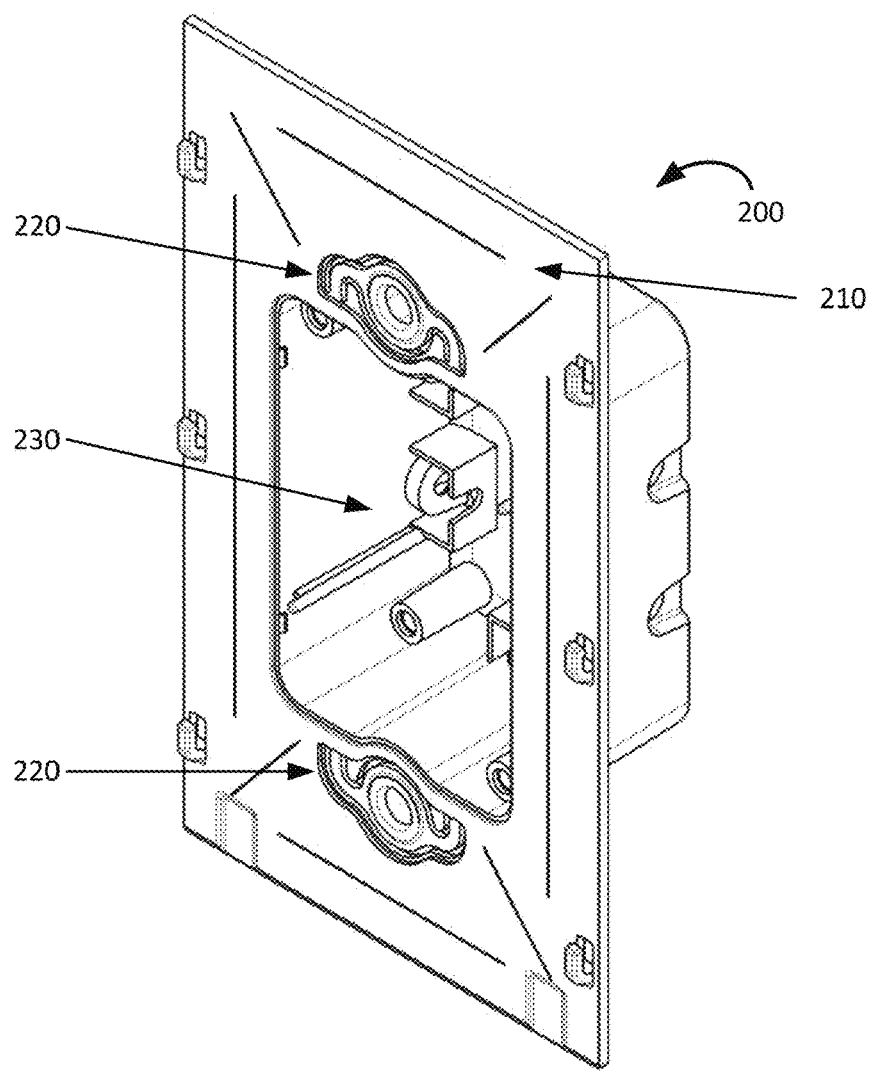
FIG. 2A and FIG. 2B illustrate an example of a base device having at least one fastener receiving structure to mount the base device against a wall.
Figure 2B:
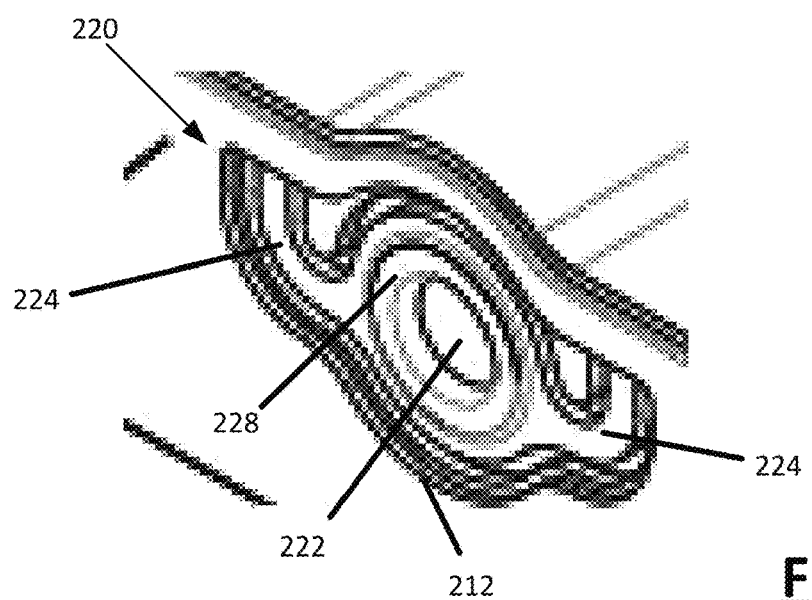

FIG. 2A and FIG. 2B illustrate an example of a mounting device 200 having at least one fastener receiving structure 220 to mount the mounting device 200 against a wall or electrical box. The mounting device 200 includes a receptacle 230, with a pair of fastener receiving structures 220 provided above and below the receptacle. The mounting device 200 may include a panel portion 210 formed from a rigid material, such as a plastic. Once mounted, the panel portion 210 is secured flush against an underlying wall. As with other examples, deflection of the panel portion 210 can cause unwanted problems, such as inability for the panel portion 210 to support electronics, circuitry, or other mounted structures. The fastener receiving structures 220 serve to prevent deflection or other unwanted strain resulting from use of fasteners to mount the mounting device 200 to a wall.

In some examples, each of the fastener receiving structures 220 can be separately formed from the panel portion 210. In variations, the fastener receiving structures 220 may be formed from a different material than the panel portion 210. For example, the panel portion 210 can be formed from plastic, while the fastener receiving structures 220 can be formed from metal.

The fastener receiving structures 220 may each be provided within a perimeter of a void of the panel portion 210. For example, the panel portion 210 may include an interior perimeter interface 212 for each fastener receiving structure 220. The interior perimeter interface 212 may correspond to an interior edge surface that supports structural members of the respective fastener receiving structure 220. In an example of FIG. 2A and FIG. 2B, the structural members of the fastener receiving structure 220 include U-shaped members 224 and a ring structure 228. An aperture 222 defined by the ring structure 228 can receive a fastener. In one implementation, over-insertion of a fastener (not shown) causes flexure by the ring structure 228 and/or U-shaped members 224. As an addition or variation, insertion of the fastener may cause inward travel by the ring structure 228 and/or U-shaped members 224.

Figure 3A:
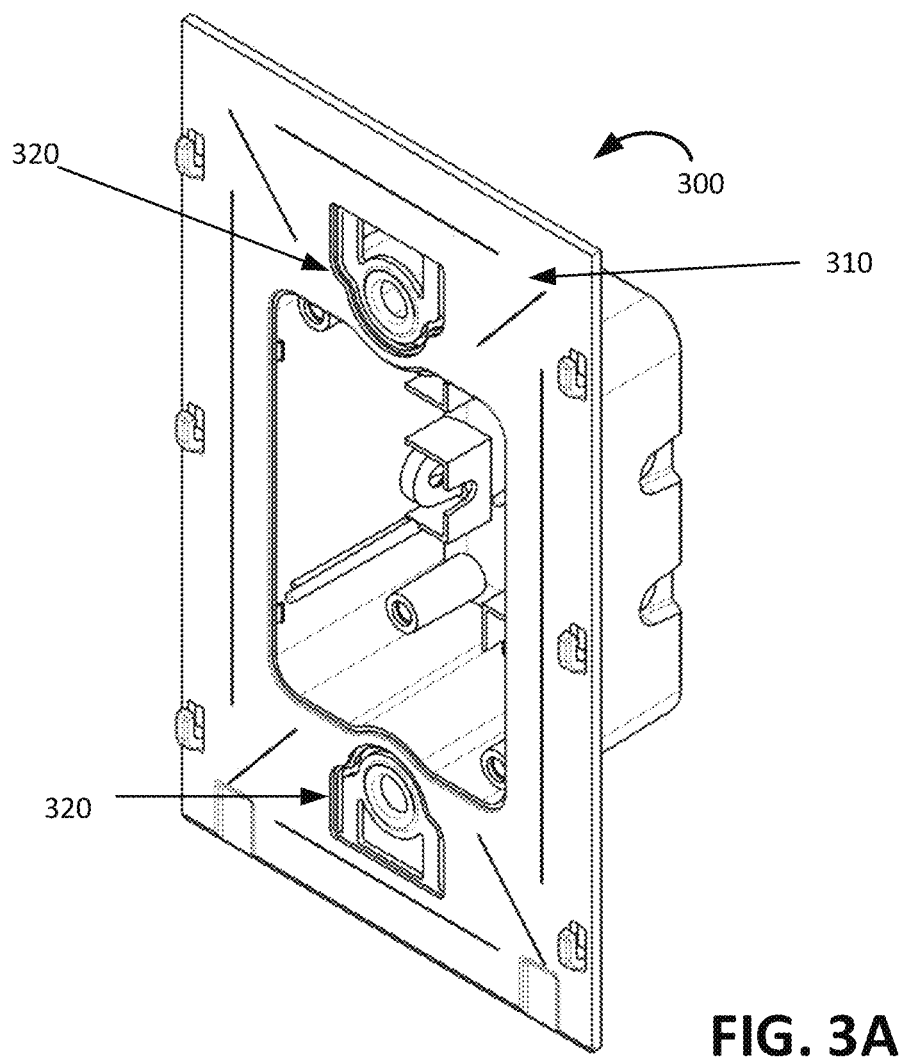
FIG. 3A and FIG. 3B illustrate another example of a base device having at least one fastener receiving structure.
Figure 3B:
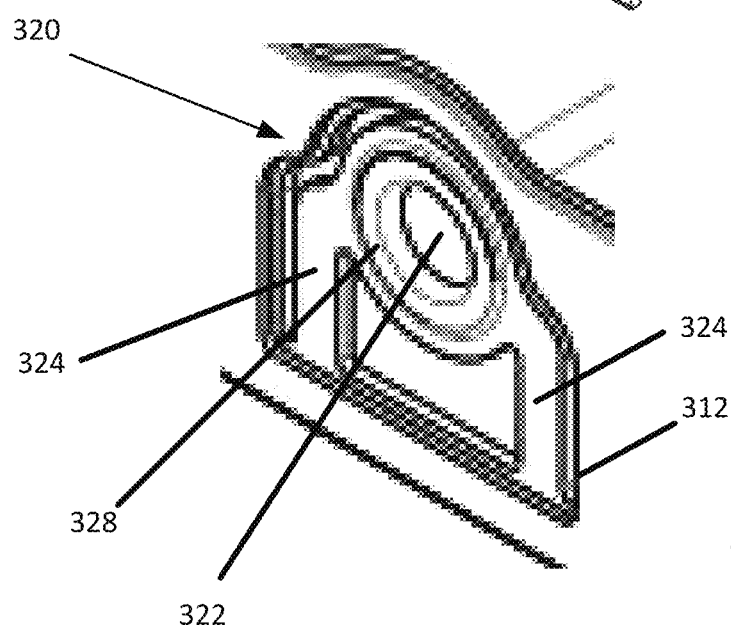

FIG. 3A and FIG. 3B illustrate another example of a mounting device 300 having at least one fastener receiving structure 320. As with other examples, the mounting device 300 includes fastener receiving structures 320 which are provided within a perimeter defined by a void of a panel portion 310. In a variation depicted by FIG. 3A and FIG. 3B, each of the fastener receiving structures 320 include legs 324 which extend from an interior perimeter interface 312 of the panel portion 310, to form a ring structure 328. The ring structure 328 defines an aperture 322 to receive a fastener. In one implementation, over-insertion of a fastener (not shown) causes flexure by the ring structure 328 and/or legs 324, and the flexure accommodates the increased width and/or inward travel of the fastener. As an addition or variation, insertion of the fastener may cause inward travel by the ring structure 328 and/or legs 324, to prevent deflection or fracture of the panel portion 310.

Figure 4A:
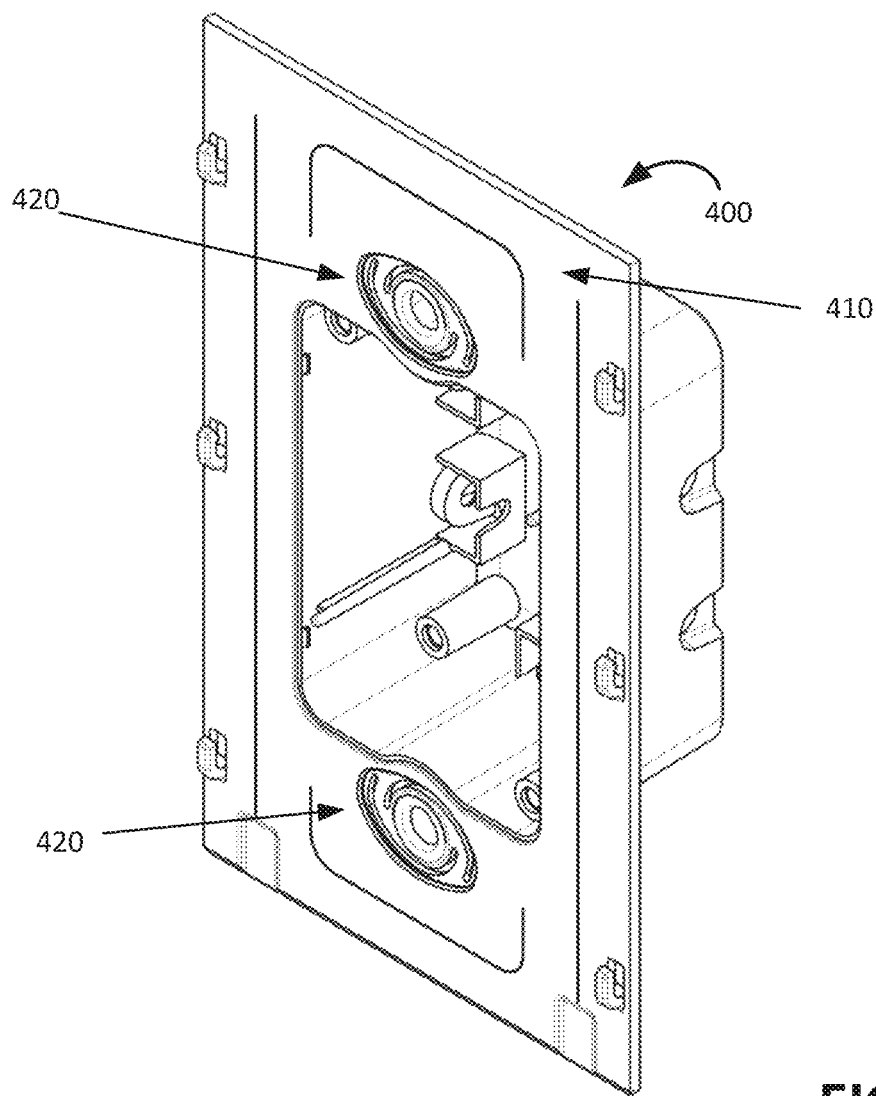
FIG. 4A and FIG. 4B illustrate yet another example of a base device having at least one fastener receiving structure.
Figure 4B:
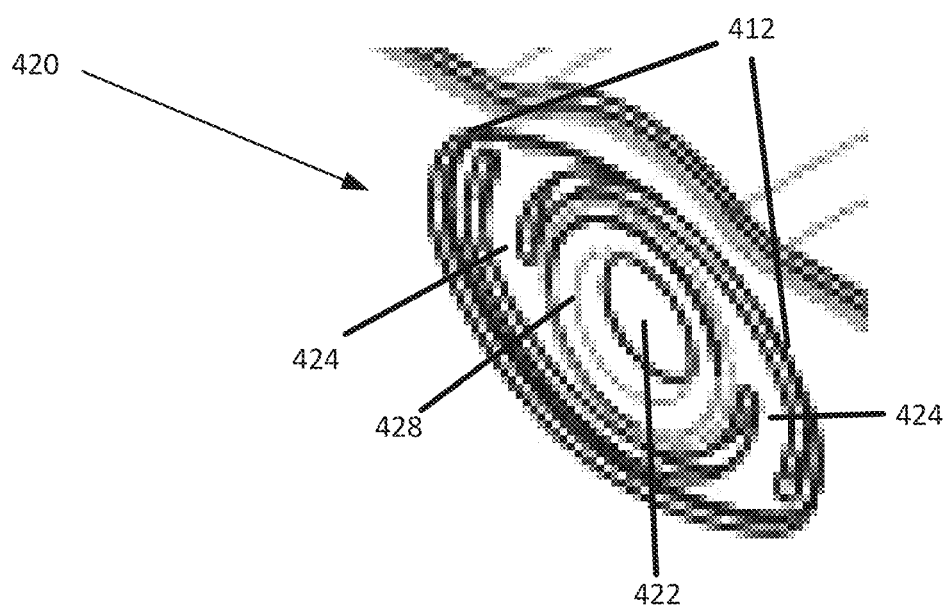

FIG. 4A and FIG. 4B illustrate yet another example of a mounting device 400 having a fastener receiving structure. The mounting device 400 includes fastener receiving structures 420 provided within a perimeter of a panel portion 410. Each of the fastener receiving structures 420 include arc members 424 that support a corresponding ring structure 428 in a void defined by an interior perimeter interface 412 of the panel portion 410. In an example of FIG. 4A and FIG. 4B, the ring structure 428 defines aperture 422 to receive a fastener (not shown). In one implementation, over-insertion of a fastener causes flexure by the ring structure 428 and/or arc members 424. As an addition or variation, insertion of the fastener may cause inward travel by the ring structure 428 and/or arc members 424, to prevent deflection or fracturing of the panel portion 410.

Base Device for Mounting Electronic Assembly to Electrical Box

Some examples provide for an electronic assembly that includes a combination of a base device and electronic module. Still further, in variations, an electronic assembly can include a base device to retain components that can interface with the wiring of an electrical box (e.g., electrical junction box for a dwelling), where the base device can also support and connect with an electronic module and a faceplate. Additionally, in some examples, the base device can be installed separately from other components of the electrical assembly. For example, the base device can be mechanically connected to an electrical junction box (e.g., gang box for light switches), and further connected to receive electrical power from the mains (e.g., electrical wiring) of a dwelling. Once the base device is installed, the electronic module and faceplate can be operatively coupled to the base device, to enable the operative assembly to perform any one of various functions, such as providing lighting control and/or a communication interface with other devices in the dwelling.

Figure 5A:
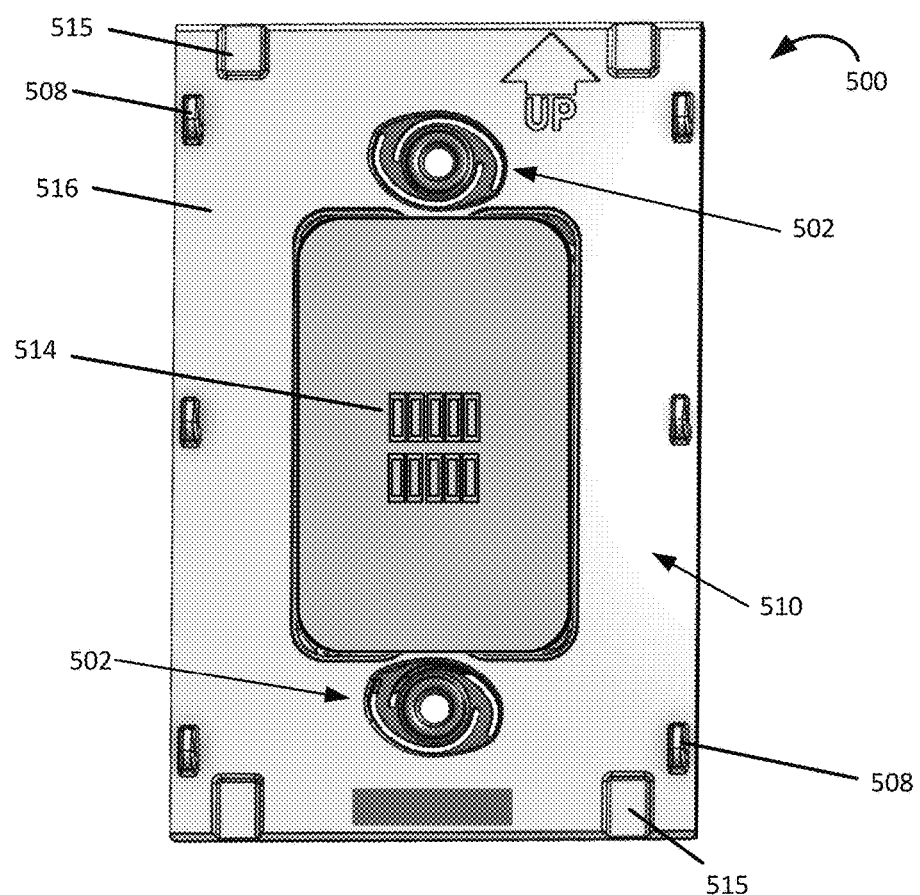
FIG. 5A illustrates a base device that can be installed to provide a modularized interface to receive an electronic module, according to one or more examples.

FIG. 5A illustrates a base device 500 that can be installed to provide a modularized interface to receive an electronic module. According to examples, the base device 500 can be installed to receive power from the wiring of a dwelling. For example, the base device 500 can be mated to an electrical junction box and connected to receive electrical power (e.g., via line and neutral wiring for a light switch). A receptacle of the base device 500 can include an electrical interface to receive and mate with electrical wiring of the dwelling (e.g., line, load, and neutral wiring). The base device 500 may also hold electrical components, such as circuitry, wiring, and/or logical components (e.g., a microcontroller) that can electrically connect with an electronic module. When installed, the base device 500 can mechanically and electrically mate with an electronic module.

Additionally, in some variations, a panel structure 516 of the base device 500 can include features to enhance functionality. For example, the panel structure 516 can include recess formations 515 positioned at or near corners of the base device 500, where additional wiring may be provided to enhance wireless communication capabilities of the base device 500 or of the mounted electronic module 520 (e.g., shown in FIG. 5D).

Figure 5B:
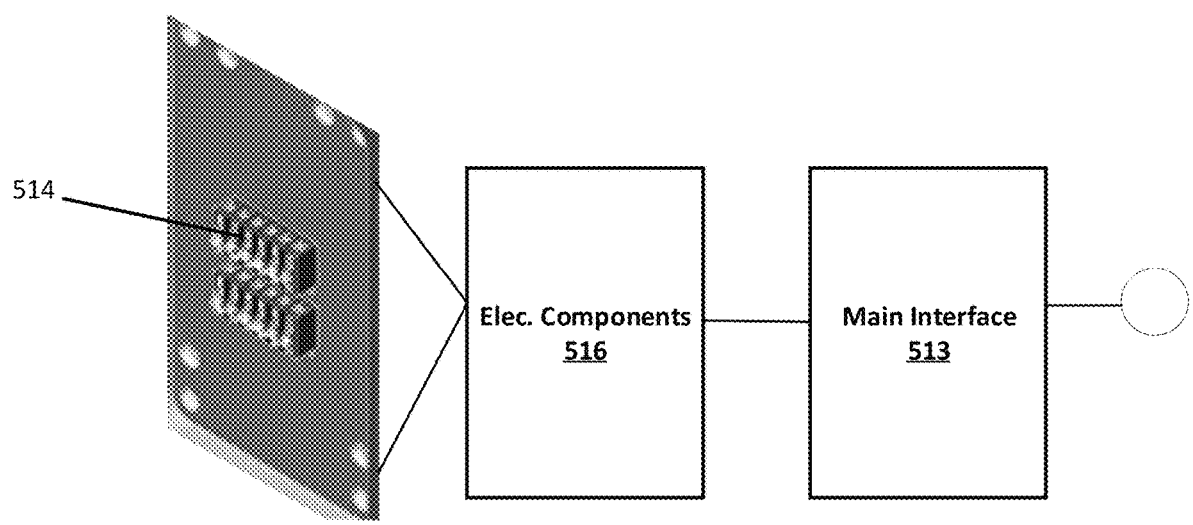
FIG. 5B illustrates a block diagram of electronic components that can be retained within a base device, in accordance with one or more examples.
Figure 5C:
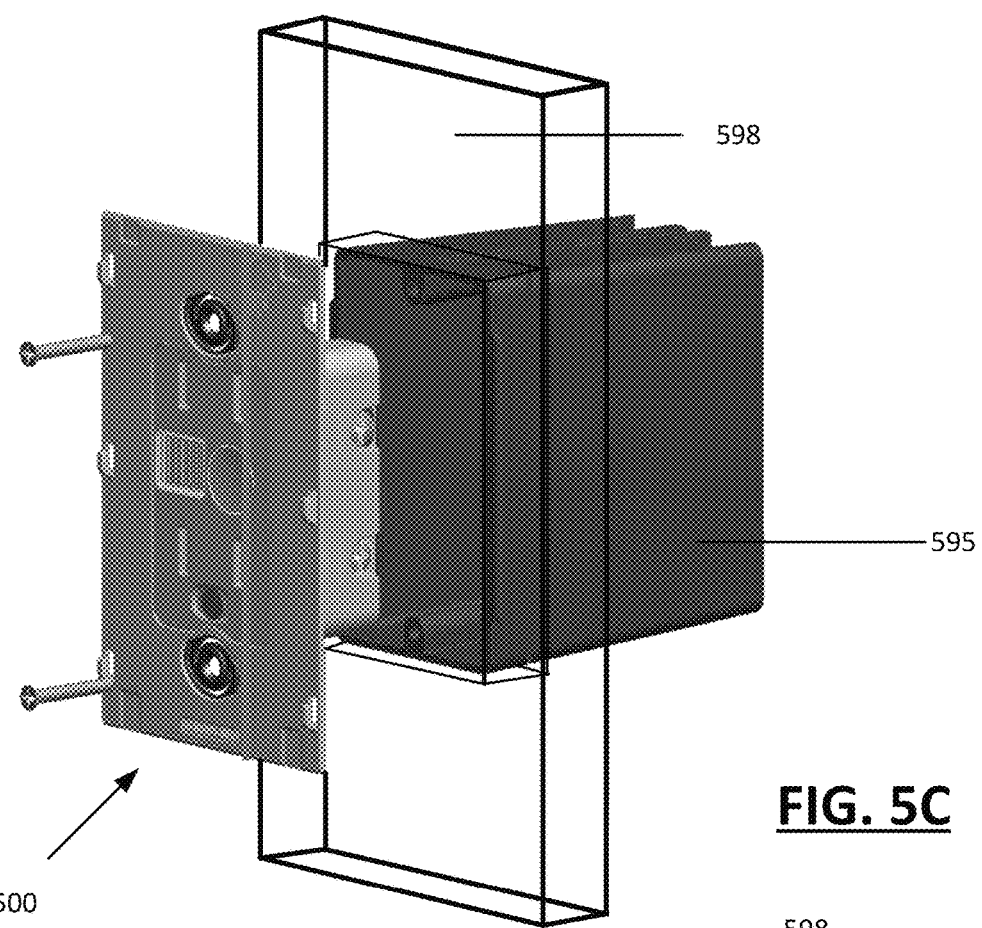
FIG. 5C illustrates a base device for an electronic assembly that is installed to an electrical box, according to one or more examples.
Figure 5D:
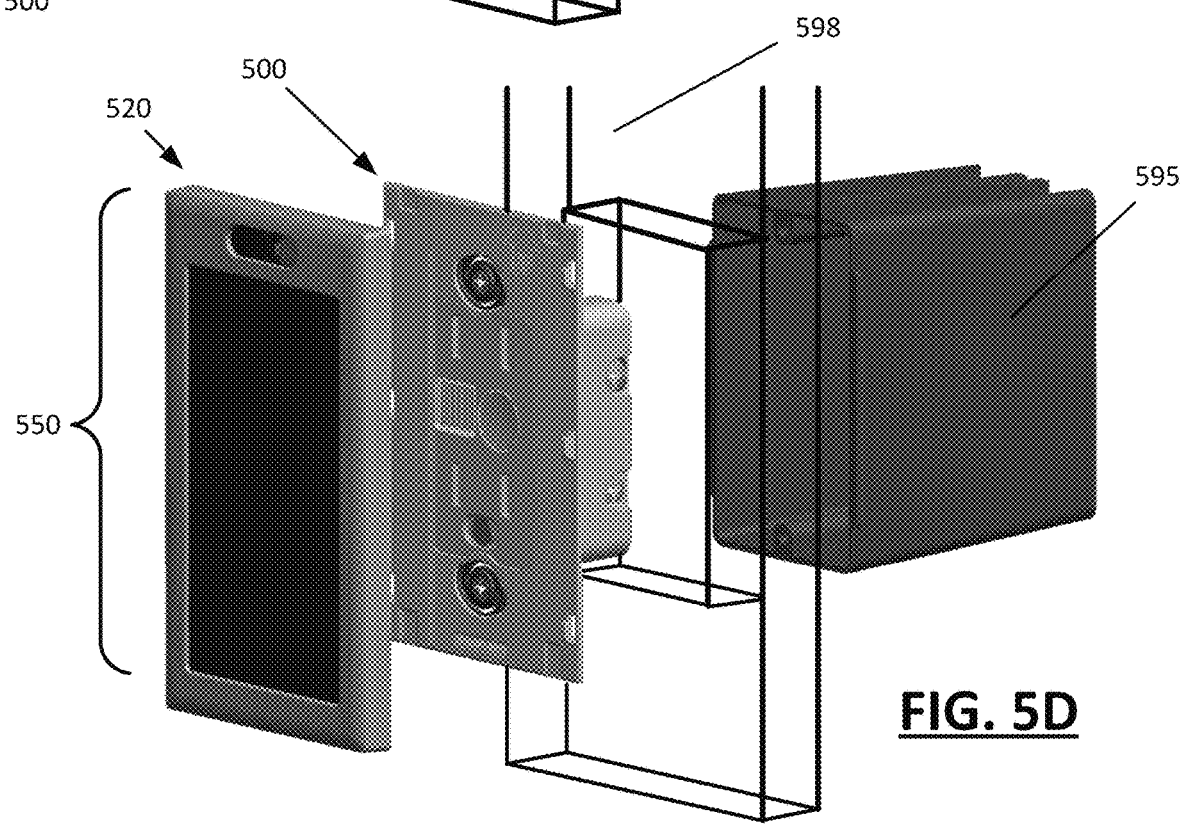
FIG. 5D illustrates installation of an electronic assembly having an electronic module and base device, with an electrical box provided within a wall, according to one or more examples.
Figure 5E:
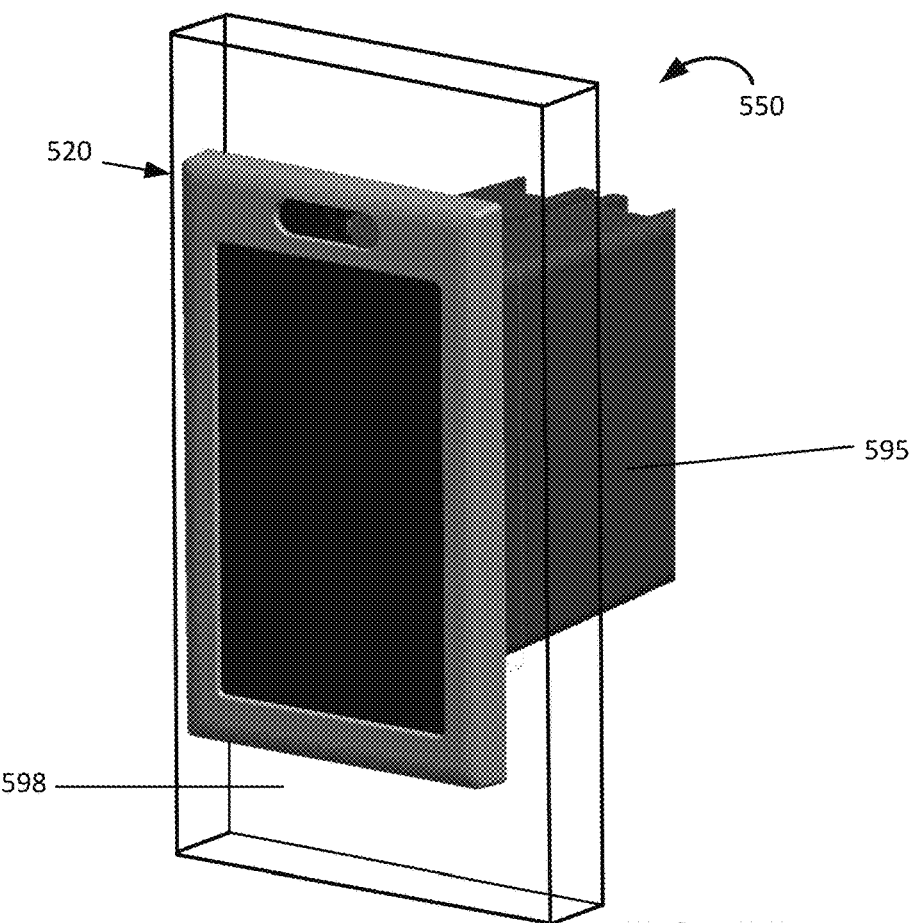
FIG. 5E and FIG. 5F illustrate an electronic assembly that is installed to an electrical box within a wall.
Figure 5F:
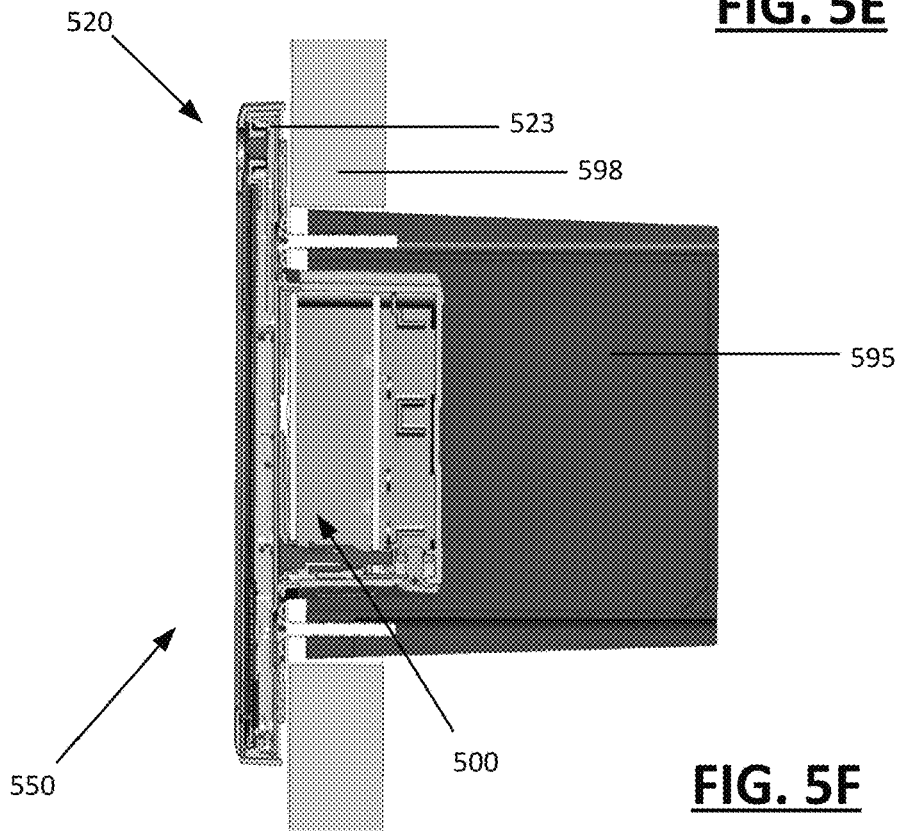

In an example, the base device 500, when installed, provides a mating interface 510 for an electrical module 520 (see FIG. 5D through 5F). The mating interface 510 includes one or more electrical connectors 514, which can extend electrical power and data connectivity to an electronic module 520. In some examples, the base device 500 is operative independent of the electronic module 520. For example, the base device 500 may include a set of core functionality which the base device 500 can perform with or without a connected electronic module 520. For example, the base device 500 may be installed to an electrical junction box in place of a conventional light switch. In such an example, the wiring provided through the electrical junction box may be connected to internal components of the base device 500, such that one or more of the electrical connectors 514 can be operated by a user as a light switch to control lighting.

The base device 500 may also include one or more fastener receiving structures 502. Each fastener receiving structure 502 can include a portion that defines an aperture for receiving the fastener. The fastener receiving structures 502 can flex, or otherwise travel inward with insertion of an insertive fastener, to reduce or eliminate strain that would otherwise result from insertion of the fastener.

In examples, the base device 500 can also include structural features to mechanically couple to an electronic module 520 using any one of a variety of different types of coupling mechanisms. For example, the base device 500 can include coupling features 508 (e.g., protrusions or hooked elements) that align and fit into corresponding apertures on a back façade of the electronic module 520. The coupling features 508 can enable the electronic module 520 to operatively attach and detach from the base device 500. When attached, the base device 500 may supply power and other resources (e.g., data communications) to the electronic module 520 using the connectors 514.

FIG. 5B illustrates a block diagram of electronic components that can be retained within the base device 500. In an example, the base device 500 includes electrical components (e.g., connectors, circuits, and/or other hardware) that interface with the mains of a dwelling ("mains interface 513"), a set of electrical components 516 that enable the base device 500 to perform functions and operations when installed, and the connectors 514. The connectors 514 can be configured to mate with corresponding connectors of the electronic module 520. By way of example, the set of electrical components 516 can include memory to store data, a microcontroller, and one or more wireless transceivers to enable communications with other devices. By way of example, the electrical components 516 may enable the base device 500 to communicate using Wi-Fi, Zigbee, Z-Wave, or Bluetooth.

In an example, the connectors 514 may extend power, data and functionality to a connected electronic module 520. In some variations, the base device 500 may also include one or more user-interface mechanisms that enable a user to interact with the base device 500 when no electronic module 520 is attached. For example, the base device 500 can include one or more interactive mechanisms (e.g., touch surface, switch, button, etc.) that enable the base device 500 to operate independently as a light switch once installed.

FIG. 5C illustrates the base device 500 installed to an electrical box 595 that is provided within a wall 598. The base device 500 can receive fasteners that mechanically secure the base device 500 to the wall 598. In an example, the electrical box 595 can be installed within the wall 598, and the base device 500 can be secured to the electrical box 595 via fasteners. In some variations, the base device 500 may include fastener receiving structures 502 to reduce or eliminate strain that may otherwise have resulted from the insertion of the fasteners during installation of the base device 500. When installed, the base device 500 can provide the mating interface 510 to mate with an electronic module 520.

FIG. 5D illustrates installation of an electronic assembly 550, having an electronic module 520 and base device 500, with the electrical box 595 provided within the wall 598. The electronic module 520 can mechanically connect to the base device 500 using structural features 508, or other retention mechanisms and features as described with other examples. The electronic module 520 can also electronically connect to the connectors 514 of the base device 500 through use of suitably configured connector elements provided on a back facade of the electronic module 520.

FIG. 5E and FIG. 5F illustrate an installed electronic assembly. In an example, an electronic assembly 550 can include the base device 500 and electronic module 520. The base device 500 can be installed to the electrical box 595 within the wall 598. As shown, the electronic module 520 can include a back façade 523 having a set of connector elements which are aligned and configured to be mated with the connectors of the base device 500. Additionally, as described with examples, the base device 500 and the electronic module 520 can utilize one or more sets of mechanical fasteners to connect the back facade of the electronic module 520 to the base device 500. For example, the back façade 523 may include openings to receive and latch onto the protrusions or other coupling features 508 (as shown in FIG. 5A).

The electronic assembly 550 can provide the electronic module 520 as a wall-mounted device that can perform functions such as control operation of light switches and other devices. As described with other examples, the electronic module 520 can provide additionally functionality for the combined assembly through, for example, a touchscreen display or touch-sensitive region, additional processing resources, wireless communication capabilities, voice input, etc. By way of example, the electronic module 520, when connected to the installed base device 500, can provide functionality to control lights or other devices through the electrical box 595, as well as other devices within a given vicinity. In some examples, the base device 500, when installed, can receive any suitably structured electronic module 520. Thus, a user can attach multiple alternative electronic modules to the base device 500. For example, a user can carry the electronic module 520 from room to room, and mate the electronic module 520 with different base devices 500 within a dwelling.

Figure 5G:
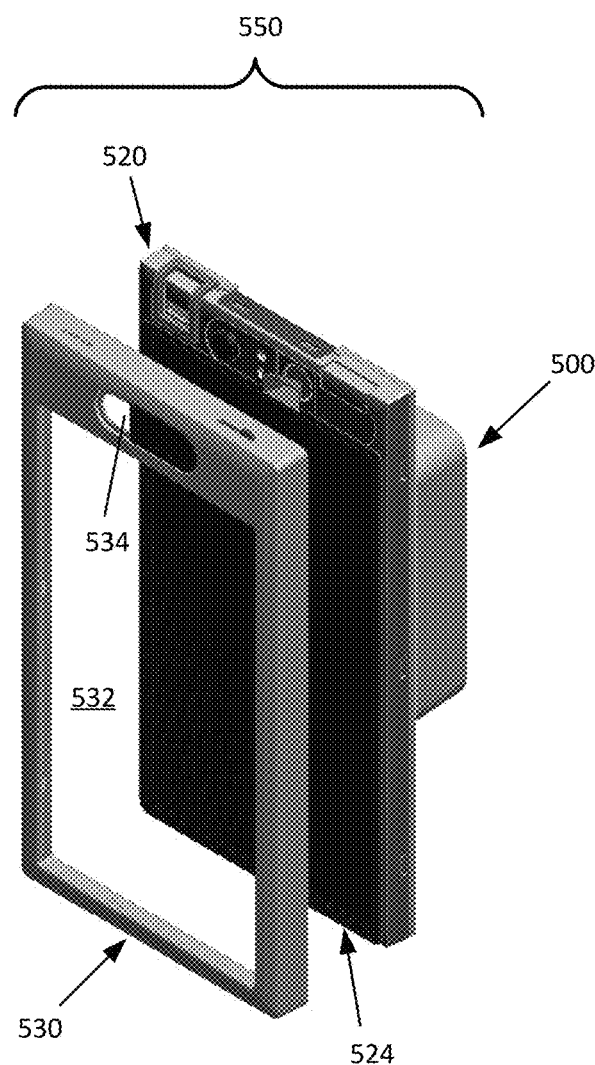
FIG. 5G and FIG. 5H illustrate an example of an electronic assembly having a base device, electronic module, and faceplate, in accordance with one or more examples.
Figure 5H:
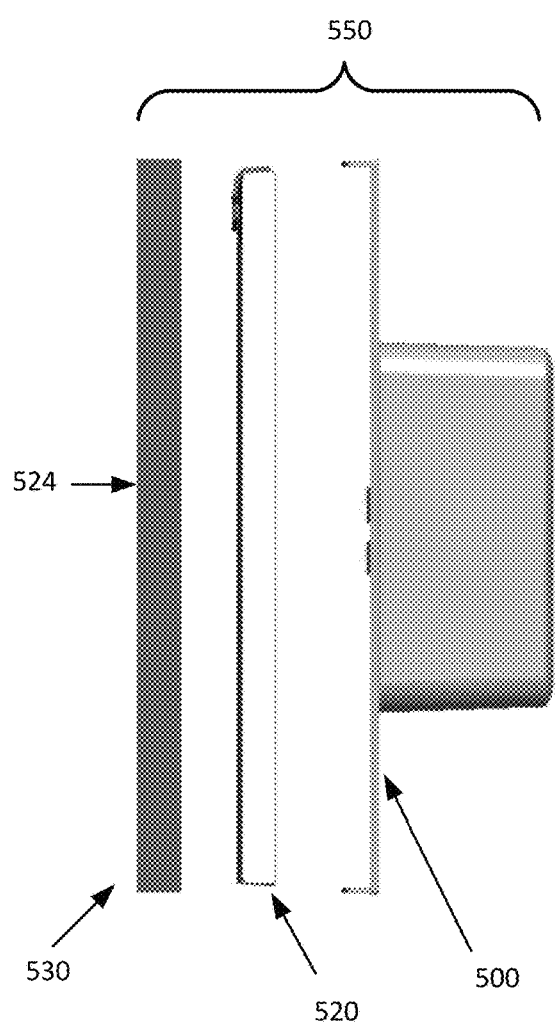

FIG. 5G and FIG. 5H illustrate an example of an electronic assembly 550 having the base device 500, the electronic module 520, and a faceplate 530. In FIG. 5G, the electronic module 520 is shown to be couplable to the faceplate 530, and is connected to the base device 500. The electronic module 520 may include a set of user-interface components on a front facade. By way of example, the front facade includes a display 524, touch-screen or touch-surface, speaker, and/or microphone.

In some examples, the faceplate 530 covers the edges of the front façade, to provide a protective and/or decorative shell for the electronic module 520. The faceplate 530 can also include voids 532, 534 which expose, for example, the display 524, camera, sensors, or touch surface of the electronic module 520. The faceplate 530 can couple to the electronic module 520 using, for example, mechanical mating fasteners, such as clasps, tangs or protrusions which can extend from either of the electronic module 520 or the faceplate 530 to mate with openings provided by the other of the module/faceplate 520, 530. In variations, the faceplate 530 can use biased clasps or members which fit around and retain the electronic module 520. In examples, the combination of the electronic module 520 and the faceplate 530 can be attached to the base device 500 via the mating interface 510.

Figure 6A:
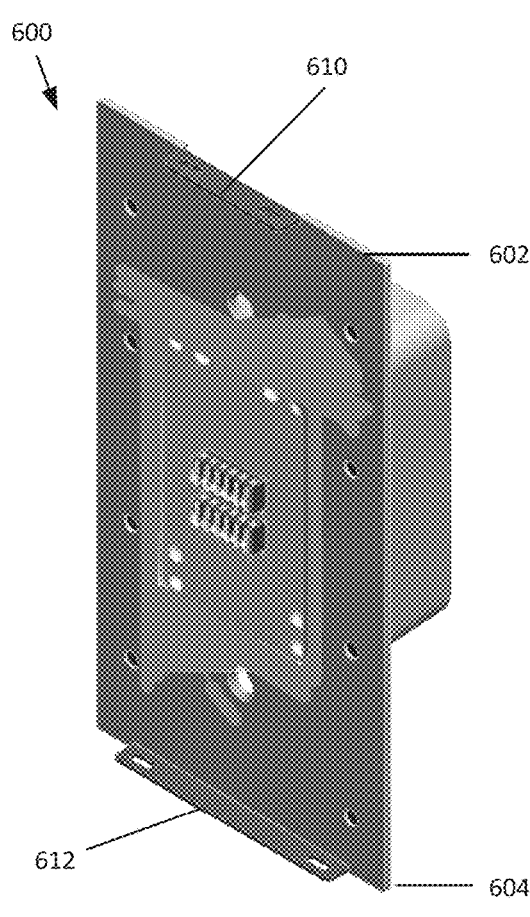
FIG. 6A and FIG. 6B illustrate alternative variations of a base device, in accordance with one or more examples.
Figure 6B:
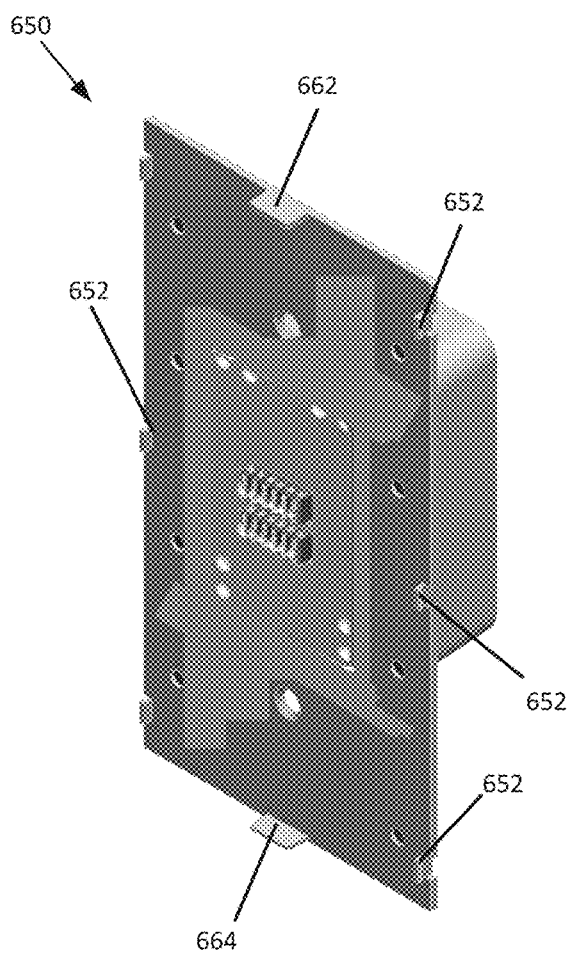

FIG. 6A and FIG. 6B illustrate alternative variations in which a base device 600, 650 includes one or multiple types of mechanical fasteners to retain an electronic module and/or faceplate. In FIG. 6A, a base device 600 includes retention structures 610, 612 on a top 602 and bottom end 604 of the base device 600. Each of the retention structures 610, 612 can include one or more apertures to receive corresponding protrusion structures from an electronic module.

In FIG. 6B, a base device 650 includes protrusions 652 (e.g., hooked elements) which extend from the sides or side edges of the base device. The protrusions 652 may be set inward by a gap, where a corresponding mating structure from the electronic module or faceplate can be received. The base device 650 may also include top and bottom support structures 662, 664 to support the electronic module when mated with the base device 650.

Figure 7A:
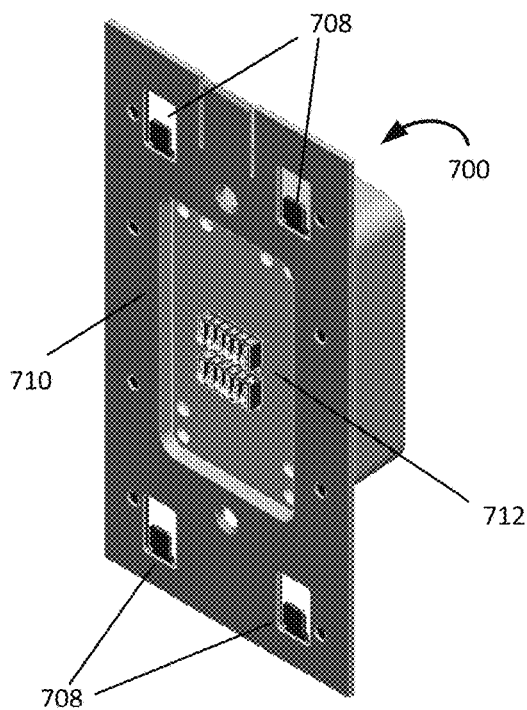
FIG. 7A through FIG. 7D illustrate another example of an electronic assembly, in which hook fasteners are used to enable attachment of an electronic module and base device.
Figure 7B:
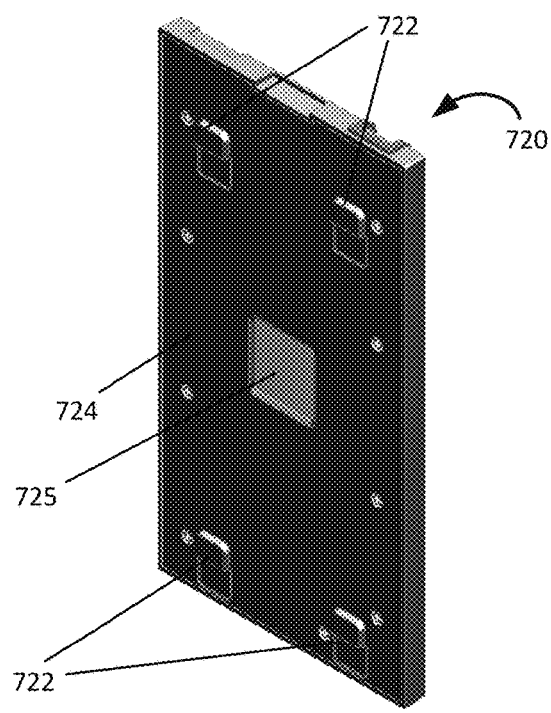
Figure 7C:
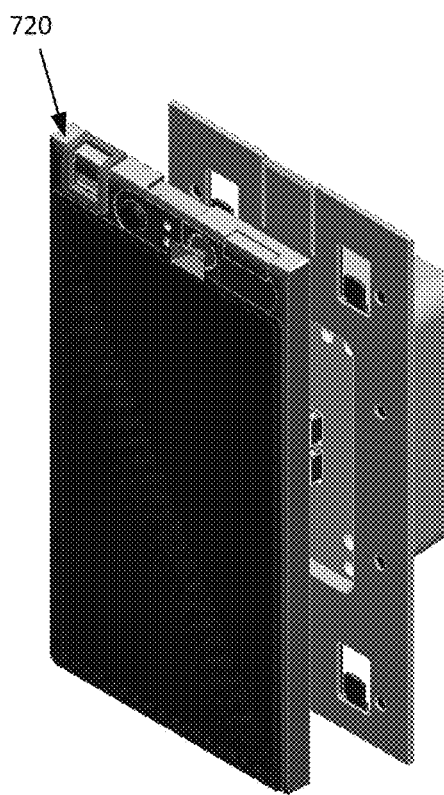
Figure 7D:
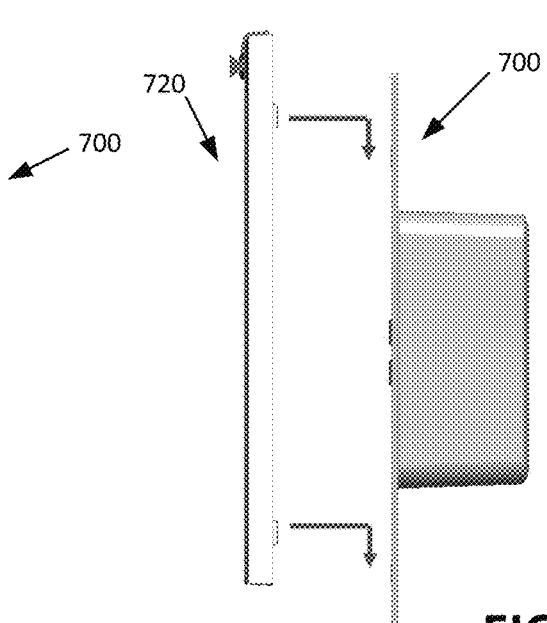

FIG. 7A through FIG. 7D illustrate another example of an electronic assembly, in which one or more hook fasteners of a base device 700 are used to retain an electronic module 720. In FIG. 7A, the base device 700 includes a set of hooks 708 (e.g., four) which extend from the panel region 710. As shown with FIG. 7B, the electronic module 720 includes receiving structures 722 that are provided on a back façade 724 of the electronic device 720 to mate with the respective hook fasteners 708 of the base device 700. In an example shown, the electronic module 720 may also include a recess 725 that provides a set of electrical connectors to mate with the electrical connectors 712 of the base device 700. With reference to FIG. 7C, the hooks 708 and receiving structures 722 can be mated to connect the base device 700 to the electronic module 720. FIG. 7D illustrates a hook motion which a user can perform to readily mate the electronic module 720 to the base device 700.

Figure 8A:
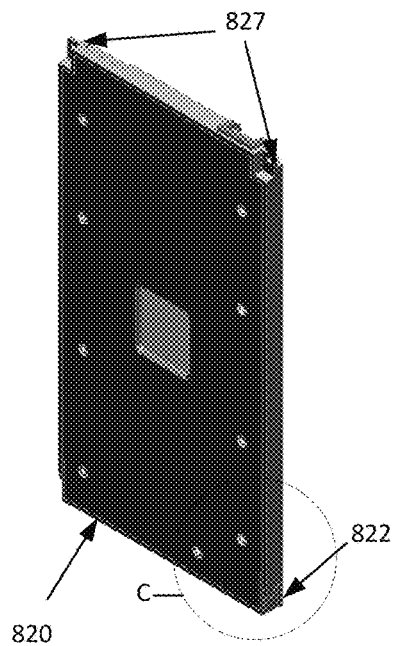
FIG. 8A through FIG. 8F illustrate another example of an electronic assembly that utilizes a slide and rotate mechanism to enable attachment of an electronic module to a base device.
Figure 8B:
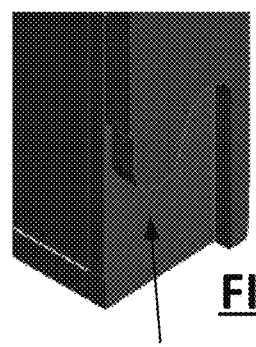
Figure 8C:
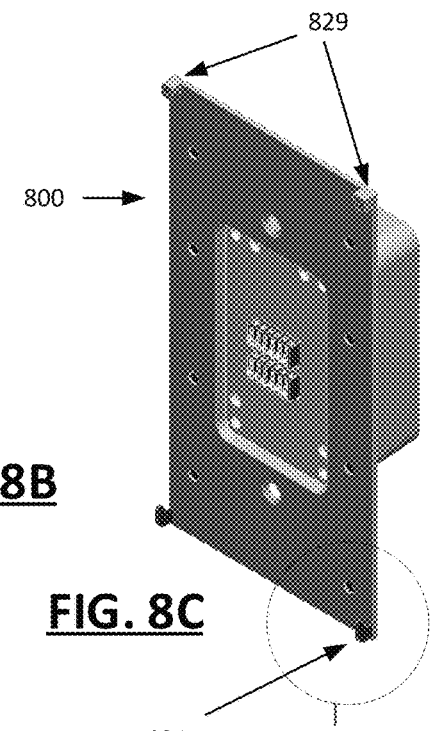
Figure 8D:
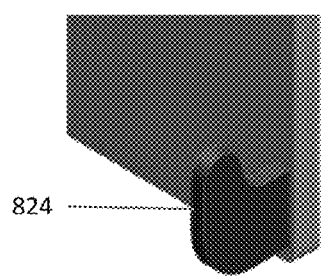
Figure 8E:
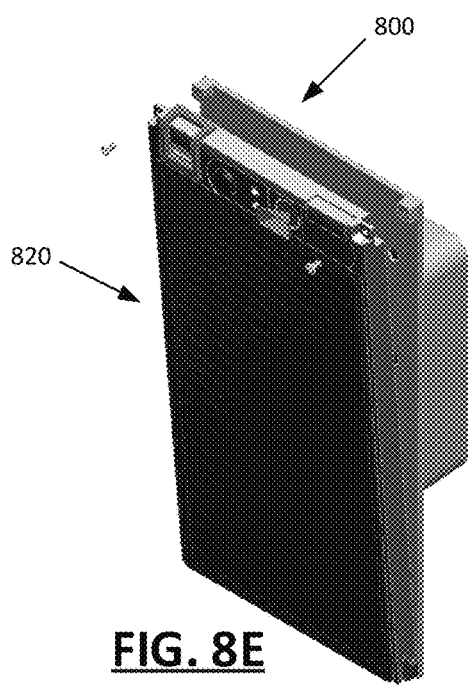
Figure 8F:
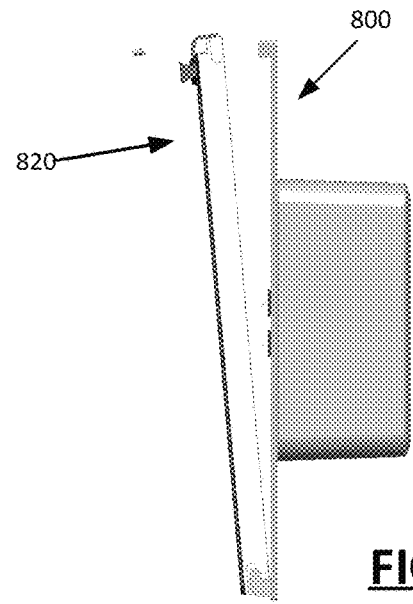

FIG. 8A through FIG. 8F illustrate another example of an electronic assembly, in which a slide and rotate mechanism is used to couple an electronic module 820 to a base device 800. FIG. 8A illustrates the rear façade of an electronic module 820 having a retention mechanism 822 positioned two bottom corners and coupling insets 827 positioned at the two top corners of the electronic module 820. FIG. 8B illustrates a closeup of detail C, showing the retention mechanism 822 as a recess formation having a receiving shape to receive a matching extension 824. In FIG. 8C, a base device 800 includes mirrored extensions 812 (e.g., retention hooks) that are shaped to mate with the retention mechanism 822 of the electronic module 820. The base device 800 further includes a pair of coupling protrusions 829 to mate with the coupling insets 827 of the electronic device 820. FIG. 8D is a close-up of detail D, showing the matching extensions 824 as extending outward and upward. FIG. 8E and FIG. 8F show the electronic module 820 and base device 800 being mated using a slide and rotate motion, in which the extension 824 of the base device 800 is received by the counterpart retention mechanism 822 of the electronic module 820, and the top portion of the electronic module 820 is pivoted towards the base device 800 such that the coupling protrusions 829 of the base device 800 are mated with the coupling insets 827 of the electronic device 820. In such examples, the coupling protrusions 829 and coupling insets 827 can be secured automatically with applied force (e.g., via a snapping fastener) or can be mechanically secured through the use of locking pins or screws.

Figure 9A:
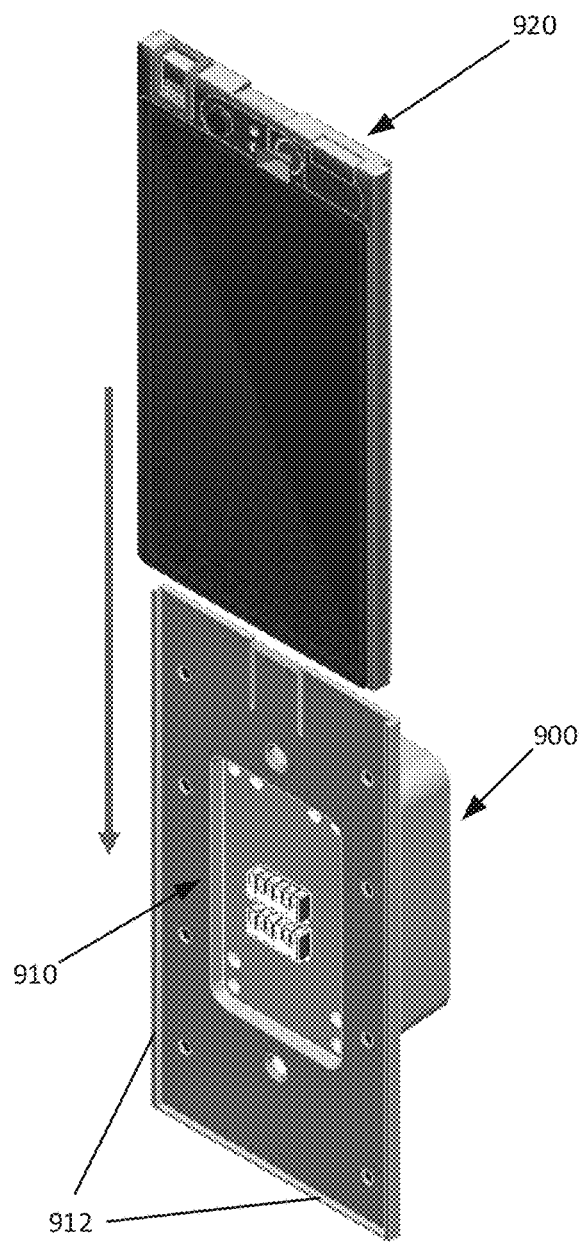
FIG. 9A and FIG. 9B illustrate an example of an electronic assembly in which a base device provides a retention receptacle for an electronic module.
Figure 9B:
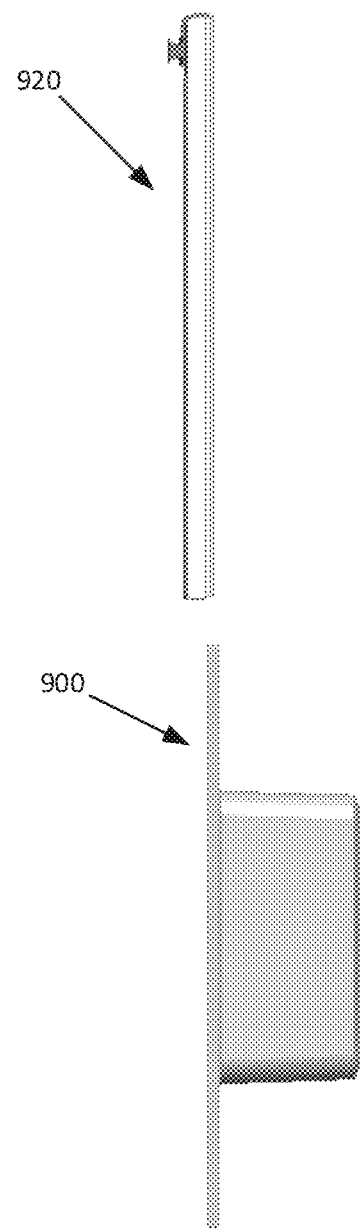

FIG. 9A and FIG. 9B illustrate another example of an electronic assembly, in which a base device 900 and an electronic module 920 are structured to enable the electronic module 920 to slide into the base device 900 as a means for securing the electronic device 920 to the base device 900. As shown by FIG. 9A, the base device 900 includes perimeter structure 912 (e.g., a lipped retention slider) which extends outward from a mating interface 910 of the base device 900. In such examples, the electronic module 920 can include a corresponding retention slider that couples to the perimeter structure 912 of the base device 900 such that a user can slide the electronic module 920 downward to couple the electronic module 920 with the base device 900 (as shown in FIG. 9A).

Base Extension

In some examples, components of an electronic assembly can be modularized to permit electronic modules of different sizes to be mated with an installed base device. As described with, for example, FIG. 5A through FIG. 5D, the base device 500 may be installed to conform to dimensions of an electrical junction box 595 (e.g., gang box). For example, the receptacle of the base device 500 in which electronic components are situated extends into an opening of the junction box 595 when installed. As such, a dimension of the receptacle of the base device 500 may be constrained by a dimension of an existing junction box 595 at the point of installation.

Moreover, junction boxes range in size, based on factors such as the number of switches (e.g., to control lights) that are to be provided through the box. Thus, a size and configuration (e.g., physical layout) of the base device 500 can also vary to accommodate junction boxes of different sizes. Likewise, the size and configuration of electronic module 520 (and faceplate 530) may also vary. For example, a larger electronic module 520 may include a larger display, or an additional sensor area. In order to enhance modularity of the base device 500, examples enable the base device to receive one or more extensions that increase its footprint when installed. With an increased footprint, the base device 500 can, for example, be installed to conform to an existing junction box, while supporting attachment of an electronic module that would otherwise be dimensioned for a larger base device.

Figure 10A:
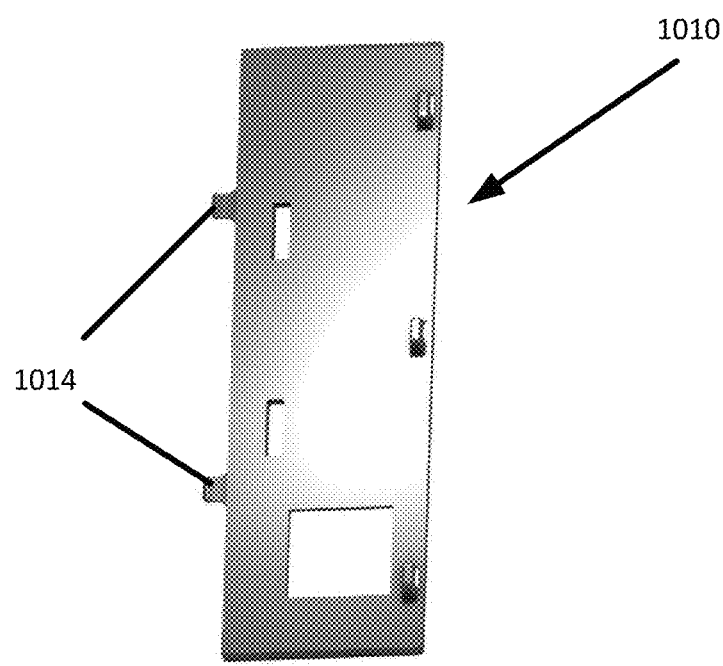
FIGS. 10A and 10B illustrate an extended base device for an electronic assembly, according to one or more examples.
Figure 10B:
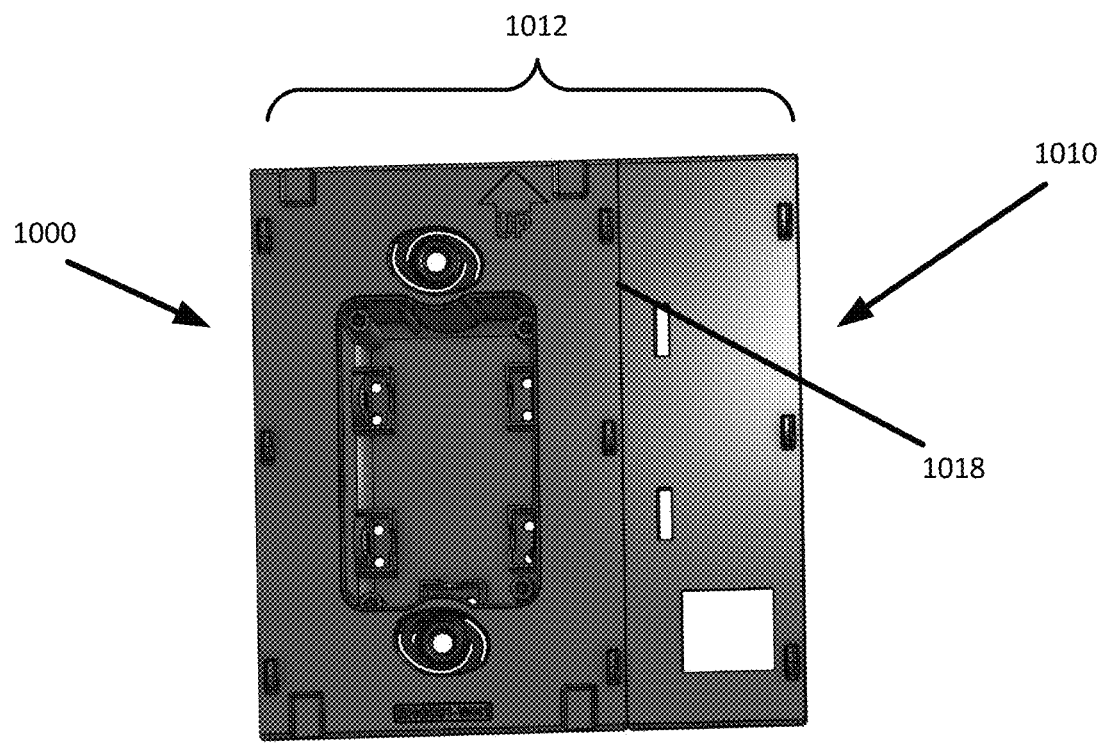

FIGS. 10A and 10B illustrate an example of an extended base device. With reference to FIG. 10A and FIG. 10B, a base device extension 1010 comprises a plate that can be positioned adjacent to a base device 1000 to result in a combined base structure 1012 having an increased dimension (e.g., width) that accommodates a larger electronic module. Depending on implementation, the extension 1010 can be secured to the underlying wall, to abut against a panel edge 1018 of the base device 1000. A dimension of the extension 1010 may be selected so that a combined dimension of the base device 1000 and extension 1010 conforms to a dimension of an electronic module that is to be mated to the combined structure 1012. The extension 1010 may also include, for example, retention structures (e.g., see FIG. 6A) and/or support structures (e.g., see FIG. 6B) to support a mounted electronic module.

To accommodate the larger electronic module, some examples provide that the extension 1010 includes lateral retaining structures 1014 that align the extension 1010 laterally and vertically to the base device 1000. In examples, the lateral retaining structures 1014 of the extension 1010 can include protrusions that extend outward and mate with corresponding recesses, openings, or coupling mechanisms along or near a panel edge 1018 of the base device 1000.

In variations, the lateral retaining structures 1014 may extend laterally outward towards the panel edge 1018. In such variations, the panel edge 1018 can include lateral recesses to receive the lateral retaining structures 1014. In other variations, the base device 1000 can include lateral structures such as described above, and the extension 1010 can include conforming recesses, openings, or coupling structures for receiving the lateral structures of the base device 1000.

Safety Switch and Plunger Mechanism

Figure 11A:
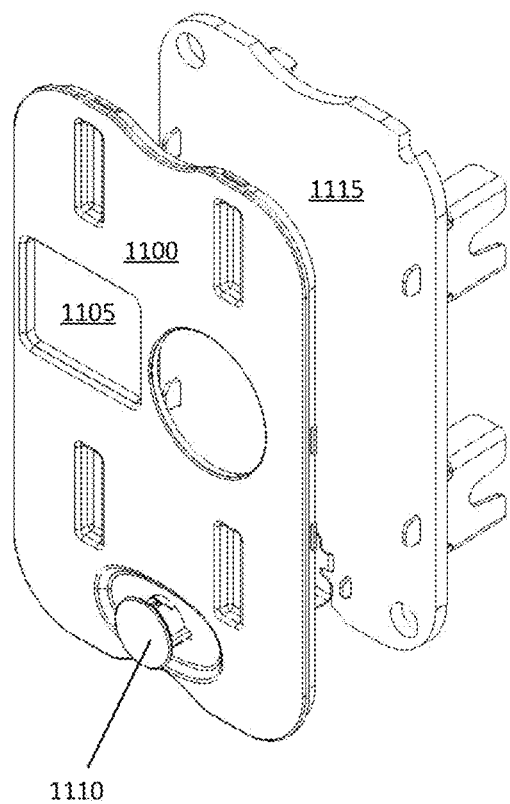
FIG. 11A through FIG. 11C illustrate an example safety switch for powering a mounted electronic device, according to various examples described herein.
Figure 11B:
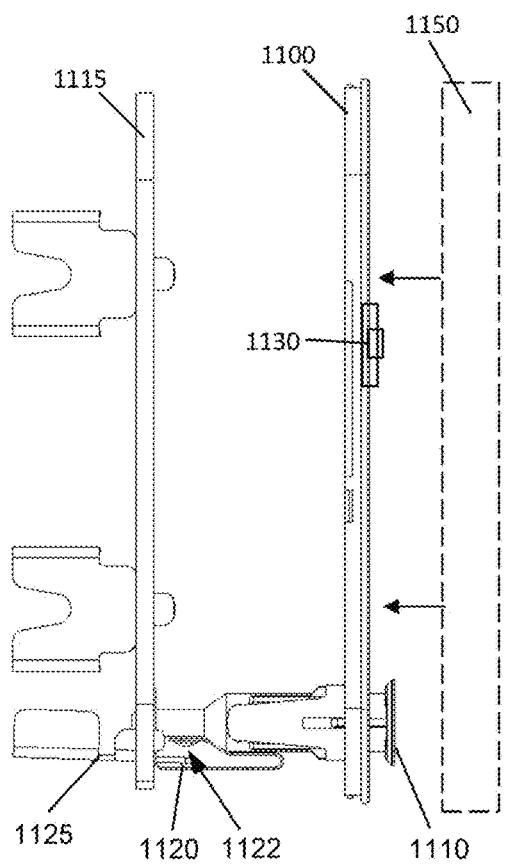
Figure 11C:
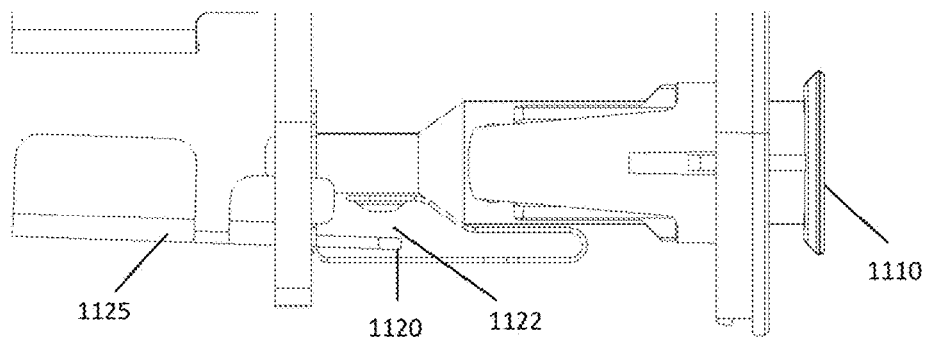

FIG. 11A through FIG. 11C illustrate an example safety switch for powering a mounted electronic device 1150, according to various examples described herein. Referring to FIGS. 11A through 11C, a mount plate 1100 for an electronic device 1150 can be mounted to an insert plate 1115 within a wall box or gang box. The mount plate 1100 can comprise an electrical mating interface for an electronic module 1150, and can include a recess 1105 for an electronic connector 1130 that provides power to the electronic device 1150. In various examples, the mount plate 1100 can include a plunger 1110 in an extended position when the electronic device 1150 is not mounted thereon. When the plunger 1110 is in the extended position, a safety switch 1120 is disengaged such that an air gap 1122 exists. In the disengaged position the safety switch 1120 decouples an electrical power line 1125 from the electronic connector 1130. As shown in FIG. 11C, when the plunger 1110 is in the extended position, the safety switch 1120 is open, creating an air gap 1122, which disconnects the power line 1125 from the mount plate 1100.

Figure 12A:
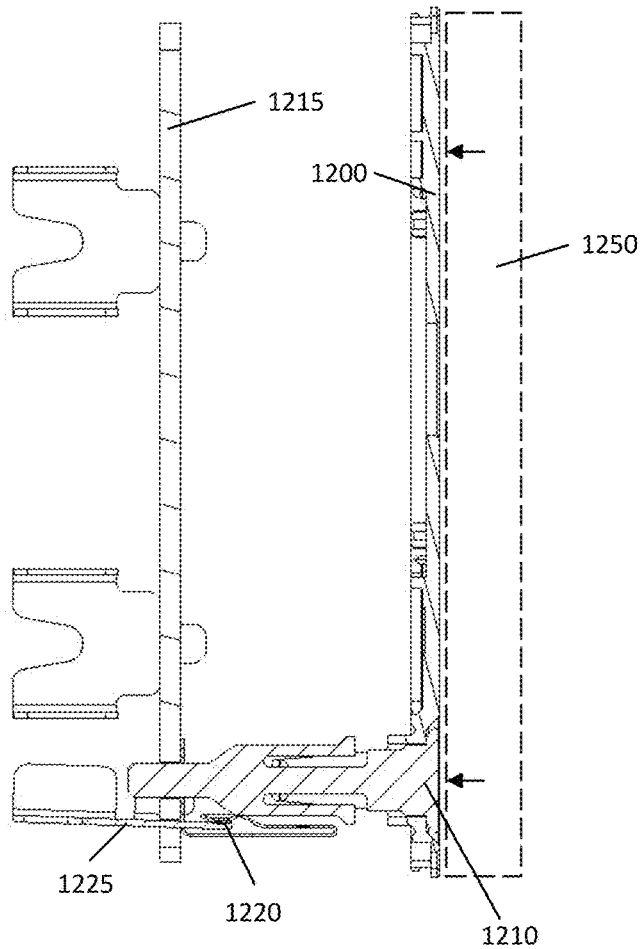
FIGS. 12A and 12B illustrate another example of a safety switch for powering a mounted electronic device, according to examples described herein.
Figure 12B:
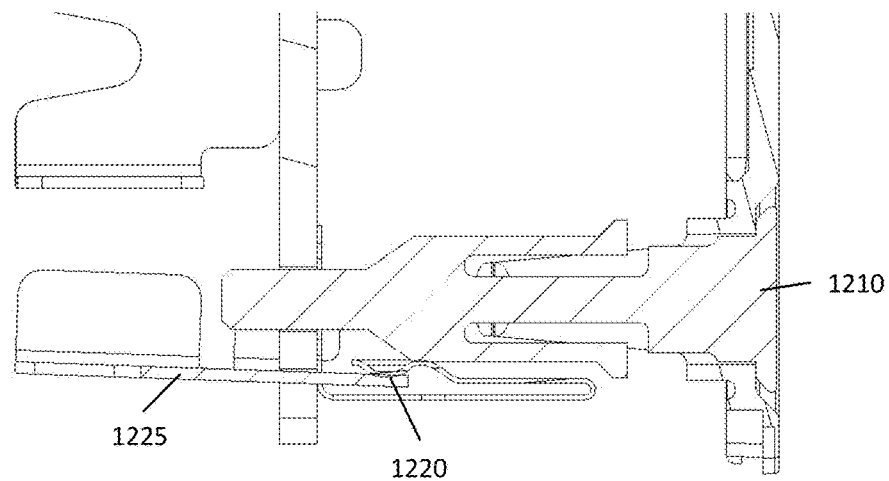

FIGS. 12A and 12B illustrate another example of a safety switch for powering a mounted electronic device 1250, according to examples described herein. As shown in FIG. 12A, the electronic device 1250 is mounted to the mount plate 1200, which depresses or pushes the plunger 1210 inward and closes the safety switch 1220, enabling electrical power to be provided to the electronic device 1250 via the power line 1225, closed switch 1220, and electrical connectors of the mount plate 1200. Accordingly, coupling the electronic device 1250 to the mount plate 1200 connects the electrical connector (not shown) to the electronic device 1250 while at the same time depresses the plunger 1210 to engage the safety switch 1220. When decoupling the electronic device 1250 from the mount plate 1200, the plunger 1210 can automatically extend, which disengages the safety switch 1220, thereby decoupling the power line 1225 to the electrical connector.

Shutter Mechanisms

FIG. 13A through 13D illustrate an example embodiment of a shutter mechanism 1345 for an electronic device, according to various examples. The electronic device can comprise embodiments described throughout the present disclosure, such as the electronic module 520 shown and described with respect to FIG. 5G and FIG. 5H. As described herein, the electronic device can include various sensors (e.g., light sensors, motion sensors, etc.) and one or more cameras that require apertures to receive or otherwise capture sensor data. Referring to FIG. 13A and FIG. 13B, a faceplate 1300 for an electronic device can include an aperture 1302 for one or more sensors (e.g., a motion detection sensor) that need not be covered or that may be required to be uncovered for optimal use of the electronic device (e.g., for detecting the presence of a user). The faceplate 1300 can further include a camera aperture 1304 for a camera of the electronic device, wherein the camera is disposed on a front façade of the electronic device (e.g., the electronic device 1150, 1250 shown in FIG. 11B and FIG. 12A).

It is contemplated that users may wish to cover the camera in certain circumstances. Thus, according to examples described, a shutter mechanism 1345 is included, as shown in the rearward views of FIGS. 13C and 13D, within the faceplate 1300 to enable a user to close the camera aperture 1304. A shutter slider 1360 of the shutter mechanism 1345 can include a shutter portion 1308 that covers the camera lens. The shutter portion 1308 can include a protrusion or lip 1306 that the user can push with a finger to open and close the shutter portion 1308. In various examples, the shutter slider 1360 of the shutter mechanism 1345 includes one or more slider pins 1312 that are guided in slider openings 1314 to ensure linear opening and closing of the shutter mechanism 1345.

In certain implementations, the shutter slider 1360 of the shutter mechanism 1345 can further include sliding dovetails 1316 so that the shutter portion 1308 is rigid to the faceplate 1300, and only allows linear movement along a width of the camera aperture 1304, which corresponds to the length of the slider openings 1314 and the rails along which the sliding dovetails 1316 slide. As shown in FIGS. 13C and 13D, the slider openings 1314 and the sliding dovetails 1316 can both be placed laterally to the camera aperture 1304 (e.g., at a same horizontal axis with respect to the faceplate 1300), since there is a sufficient gap 1307 between the camera aperture 1304 and the edge of the faceplate 1300 (as shown in FIG. 13B). This gap 1307 enables the shutter portion 1308 and shutter mechanism 1345 to be disposed behind the faceplate 1300 along the length of the gap 1307 and lateral to the camera aperture 1304. Further description of the shutter slider 1360 of FIGS. 13A through 13D is provided below in connection with FIGS. 15A and 15B.

Figure 15A:
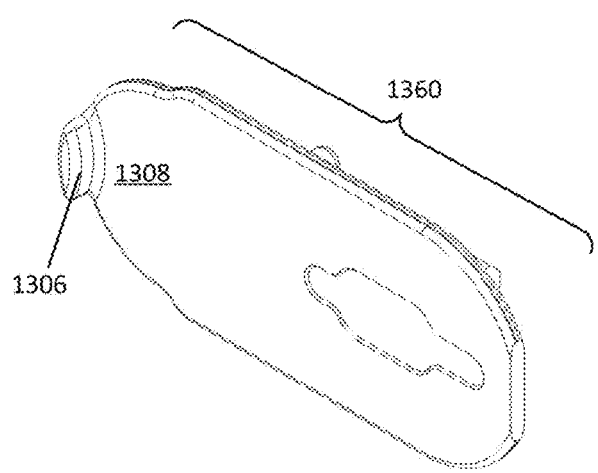
FIG. 15A and FIG. 15B illustrate a shutter device implemented in the shutter mechanism as shown and described with respect to FIG. 13A through FIG. 13D.
Figure 15B:
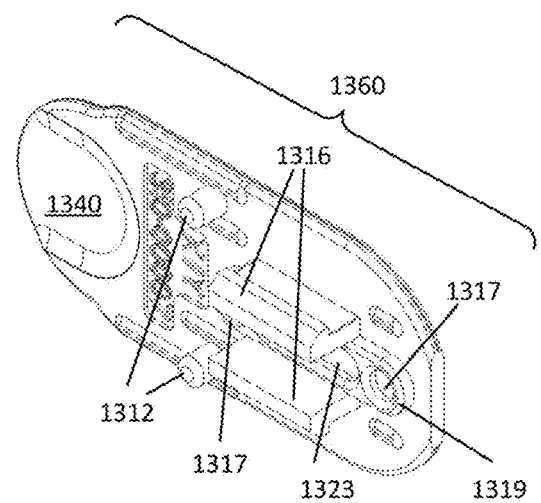

Referring to FIG. 13D, the chassis of the electronic device or the faceplate 1300 can include a lever arm 1321 that includes a locking pin that soft locks to a pair of corresponding locking holes 1317 of a tacking portion 1319 of the shutter mechanism 1345 (shown in FIG. 15B). For example, the locking pin can be located at a distal end of the lever arm 1321 and can slide within a guiding groove 1323 (shown in FIG. 15B) to soft lock in an open position in which the locking pin locks to a first locking hole 1317, and a closed position in which the locking pin locks to the other locking hole 1317. Further detail of this soft locking feature is provided below with respect to FIG. 15B.

Figure 14A:
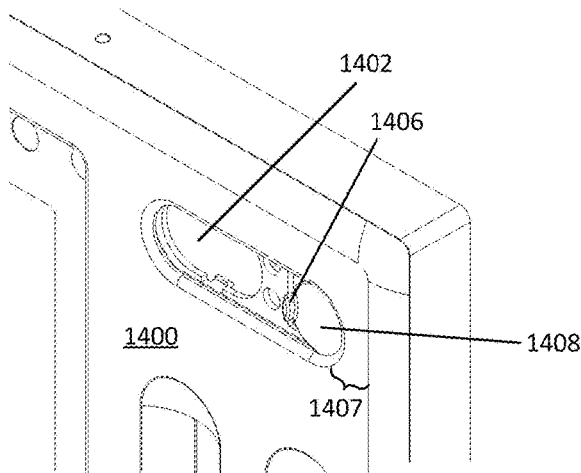
FIG. 14A through 14C illustrate another example embodiment of a shutter mechanism for an electronic device, according to examples described herein.
Figure 14B:
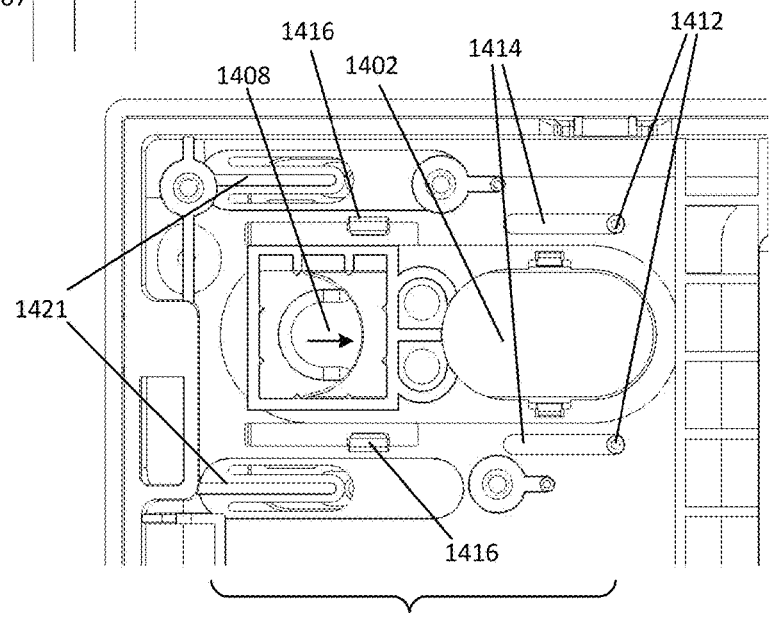
Figure 14C:
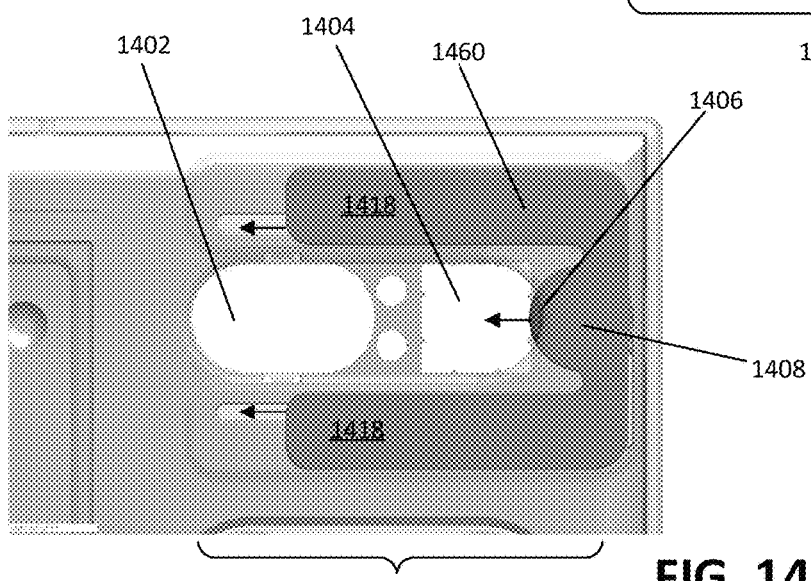

FIG. 14A through 14C illustrate another example embodiment of a shutter mechanism 1445 for an electronic device, according to examples described herein. As shown in FIG. 14A, a shutter portion 1408 covering the camera aperture 1404 also includes a protrusion or lip 1406, and the sensor aperture 1402 remains open. The shutter mechanism 1445 shown and described with respect to FIGS. 14A through 14C is an alternative embodiment required for electronic devices and corresponding faceplates 1400 in which a gap 1407 between the camera aperture 1404 and an edge of the faceplate is inadequate for the simple installation and configuration of the shutter mechanism 1345 of FIGS. 13A through 13D. Thus, referring to FIG. 14B, the rails for the sliding dovetails 1416 of the shutter mechanism 1445 are positioned above and below the camera aperture 1404 as opposed to being laterally positioned in relation to the camera aperture 1404. Accordingly, the sliding dovetails 1416, slider openings 1414, and slider pins 1412 are positioned on horizontal axes that are above and below a horizontal axis of the camera aperture 1404 and sensor aperture 1402 respectively. Furthermore, in some aspects, the gap 1407 can comprise a width that is substantially equivalent to a width of the shutter portion 1408 of the shutter slider 1460.

Figure 16A:
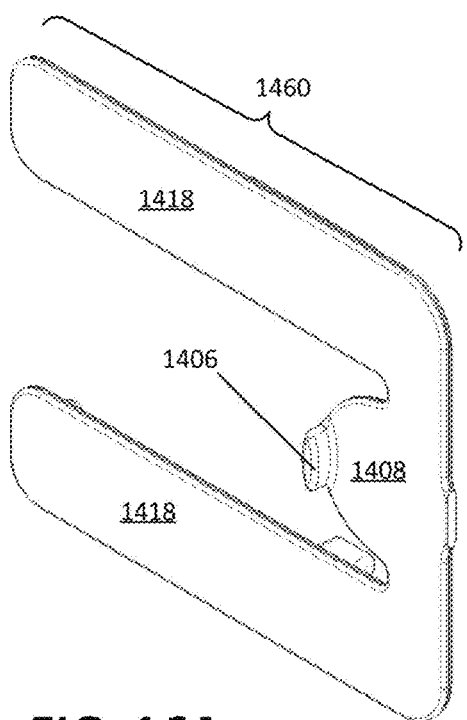
FIG. 16A and FIG. 16B illustrate a shutter device implemented in the shutter mechanism as shown and described with respect to FIG. 14A through FIG. 14C.
Figure 16B:
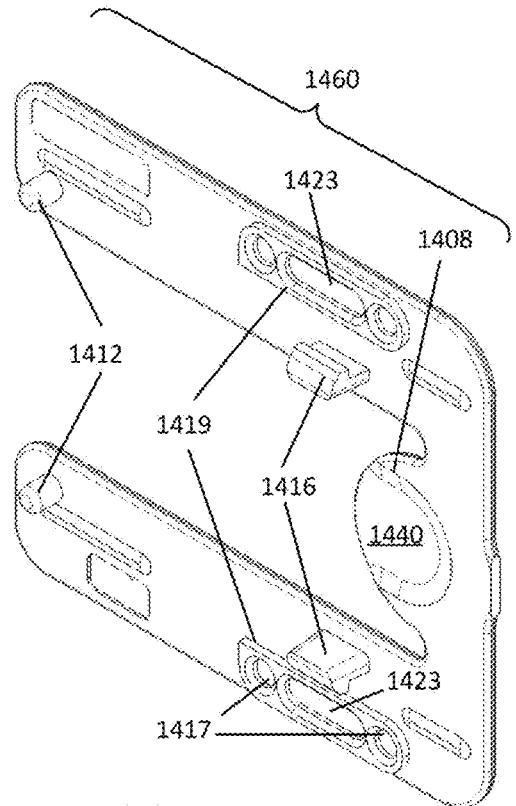

Referring to FIG. 14B, the chassis of the electronic device or faceplate 1400 can include a pair of lever arms 1421 each including a locking pin configured to slide within a guiding groove 1423 between two locking holes 1417 of a tacking portion 1419 of the shutter mechanism 1445 (shown in FIG. 16B). For example, for each lever arm 1421, the locking pin can be located at a distal end of the lever arm 1421 and can slide within the guiding groove 1423 (shown in FIG. 16B) to soft lock in an open position in which the locking pin locks to a first locking hole 1417, and a closed position in which the locking pin locks to the other locking hole 1417. Further detail of this soft locking feature is provided below with respect to FIG. 16B.

The shutter slider 1460 can comprise a shutter portion 1408 to cover the camera aperture 1404 when closed, and one or more slider appendages 1418 that stabilize the shutter slider 1460. In the example shown in FIG. 14C, the shutter slider 1460 comprises a pair of slider appendages 1418. The slider pins 1412 and sliding dovetails 1416 can each be coupled to a respective slider appendage 1418, which may then be coupled to slider openings 1414 and rails respectively. Further description of the shutter slider 1460 of FIGS. 14A through 14C is provided below in connection with FIGS. 16A and 16B.

FIG. 15A and FIG. 15B illustrate a shutter slider 1360 implemented in a shutter mechanism 1345 as shown and described with respect to FIG. 13A through FIG. 13D. As shown in FIG. 15A, the shutter slider 1360 includes a shutter portion 1308 and a protrusion or lip 1306. Referring to FIG. 15B, a backside of the shutter slider 1360 can include multiple slider pins 1312 and multiple sliding dovetails 1316 that hold the shutter slider 1360 in a constant horizontal position and enables movement along a single linear axis. It is contemplated that certain applications of shutter mechanisms can scratch or cause damage to camera lenses. In order to prevent such damage, the rear side of the shutter portion 1308 can include a recess 1340 so that the rear side of the shutter portion 1308 does not make contact with the camera lens of the electronic device.

As shown in FIG. 15B, the shutter slider 1360 can include a tacking portion 1319 that comprises a pair of locking holes 1317, one for an open position of the shutter mechanism 1345 and the other for a closed position of the shutter mechanism 1345. A guiding groove 1323 can be disposed between the locking holes 1317 to guide the locking pin of the lever arm 1321 of the chassis between the open and closed positions. In practice, a user opening and closing the shutter mechanism 1345 will feel an initial click corresponding to the locking pin being released from one locking hole 1317, and a subsequent click corresponding to the locking pin engaging the other locking hole 1317.

FIG. 16A and FIG. 16B illustrate a shutter slider 1460 implemented in the shutter mechanism 1445 as shown and described with respect to FIG. 14A through FIG. 14C. As shown in FIG. 16A, the shutter slider 1460 can include a shutter portion 1408 having a protrusion or lip 1406, and a pair of appendages 1418, as described herein. Referring to FIG. 16B, the shutter slider 1460 can further include multiple slider pins 1412 and multiple sliding dovetails 1416 that also enable movement only along a single linear axis. The shutter slider 1460 shown in FIG. 16B also includes a recess 1440 on a rear side of the shutter portion 1408 to prevent contact between the shutter portion 1408 and the camera lens.

As shown in FIG. 16B, the shutter slider 1460 includes a pair of tacking portions 1419 (e.g., an upper tacking portion and a lower tacking portion), each including a pair of locking holes 1417 and a guiding groove 1423 disposed therebetween. A corresponding locking pin on a corresponding lever arm 1421 for each tacking portion 1419 can engage with and disengage from each locking hole 1417 depending on whether the shutter mechanism 1445 is in a closed or open position. Like the shutter slider 1360 described in FIG. 15B, the shutter slider 1460 in FIG. 16B can be utilized by a user to open and close the shutter mechanism 1445, and the user will feel a click corresponding to the locking pin disengaging with one locking hole 1417 and a subsequent click corresponding to the locking pin engaging with the other locking hole 1417. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A mounting device comprising:
a panel portion; and
a fastener receiving structure provided within a perimeter of the panel portion, the fastener receiving structure including a flexure mechanism having an aperture, the flexure mechanism being configured to flex inward with insertion of a fastener into the aperture of the flexure mechanism until when the flexure mechanism flexes inward beyond a threshold; and wherein the flexure mechanism includes a failure rib that snaps when the flexure mechanism flexes inward beyond the threshold.

2. The mounting device of claim 1, wherein the failure rib is configured to provide at least one of an audible or tactile feedback when it fails.

3. The mounting device of claim 1, wherein the flexure mechanism is configured to travel inward with one or more flexure arms with insertion of the fastener.

4. The mounting device of claim 1, wherein the aperture of the flexure mechanism is defined at least in part by metal.

5. The mounting device of claim 1, wherein the fastener receiving structure is separately formed from the panel portion.

6. The mounting device of claim 1, wherein the flexure mechanism includes displaceable arms that are configured to extend inwards with insertion of the fastener.

7. The mounting device of claim 6, wherein the arms of the flexure mechanism are arced.

8. The mounting device of claim 6, wherein the arms of the flexure mechanism forms a corkscrew shape.

9. The mounting device of claim 6, wherein the arms of the flexure mechanism are U-shaped.

\* \* \* \* \*